United States Patent
Kobashi et al.

(10) Patent No.: US 7,596,746 B2
(45) Date of Patent: Sep. 29, 2009

(54) INFORMATION PROCESSING METHOD AND APPARATUS, AND COMPUTER-READABLE PROGRAM

(75) Inventors: Kazuhumi Kobashi, Yokohama (JP); Kenta Hara, Kawasaki (JP); Jun Makino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 11/030,666

(22) Filed: Jan. 6, 2005

(65) Prior Publication Data

US 2005/0168780 A1 Aug. 4, 2005

(30) Foreign Application Priority Data

Jan. 30, 2004 (JP) ............... 2004-024590

(51) Int. Cl.
*G06F 17/00* (2006.01)
(52) U.S. Cl. .................. 715/235; 715/243; 715/236
(58) Field of Classification Search ................ 715/530, 715/500, 235, 236, 243
See application file for complete search history.

(56) References Cited

U.S. PATENT DOCUMENTS

| | | | | |
|---|---|---|---|---|
| 6,088,710 | A * | 7/2000 | Dreyer et al. | 715/517 |
| 6,161,114 | A * | 12/2000 | King et al. | 715/517 |
| 6,233,571 | B1 * | 5/2001 | Egger et al. | 707/2 |
| 6,366,918 | B1 * | 4/2002 | Guttman et al. | 707/100 |
| 6,601,057 | B1 * | 7/2003 | Underwood et al. | 707/1 |
| 6,613,099 | B2 * | 9/2003 | Crim | 715/523 |
| 2001/0013046 | A1 * | 8/2001 | Katayama et al. | 707/530 |
| 2001/0035875 | A1 * | 11/2001 | Suzuki et al. | 345/723 |
| 2002/0122067 | A1 * | 9/2002 | Geigel et al. | 345/788 |
| 2002/0152245 | A1 * | 10/2002 | McCaskey et al. | 707/530 |
| 2003/0079177 | A1 * | 4/2003 | Brintzenhofe et al. | 715/500 |
| 2003/0229845 | A1 * | 12/2003 | Salesin et al. | 715/500 |
| 2004/0088649 | A1 * | 5/2004 | Elder et al. | 715/501.1 |

FOREIGN PATENT DOCUMENTS

| | | |
|---|---|---|
| JP | 7-129658 A | 5/1995 |
| JP | 2000-155795 A | 6/2000 |

* cited by examiner

*Primary Examiner*—Boris Pesin
(74) *Attorney, Agent, or Firm*—Canon U.S.A. Inc., I.P. Division

(57) ABSTRACT

An information processing technology for efficiently checking layout results for all data records is provided. Variable data input from a data source is assigned to partial display areas contained in a template to determine the size of each of the partial display areas based on the assigned variable data. Specified data for disposing the partial display areas at regular positions in a page is compared with a plurality of items of stored data assigned to the partial display areas to extract an item of data that matches a designated extracting condition. The extracted item of data is assigned to the partial display areas to display a first layout of the partial display areas in the page together with a second layout based on the specified data. The second layout based on the specified data is modified and displayed in accordance with a modification made to the first layout.

18 Claims, 35 Drawing Sheets

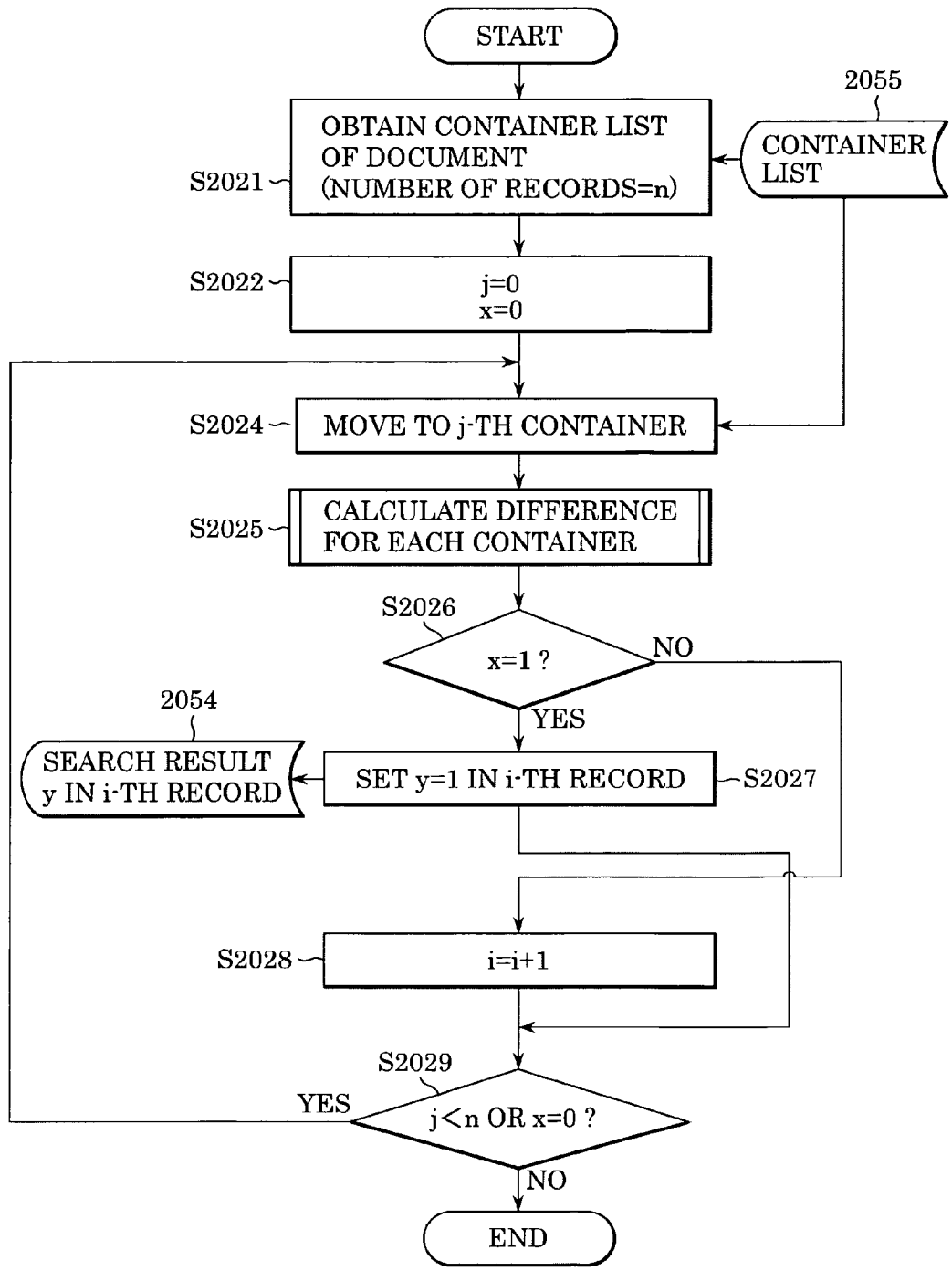

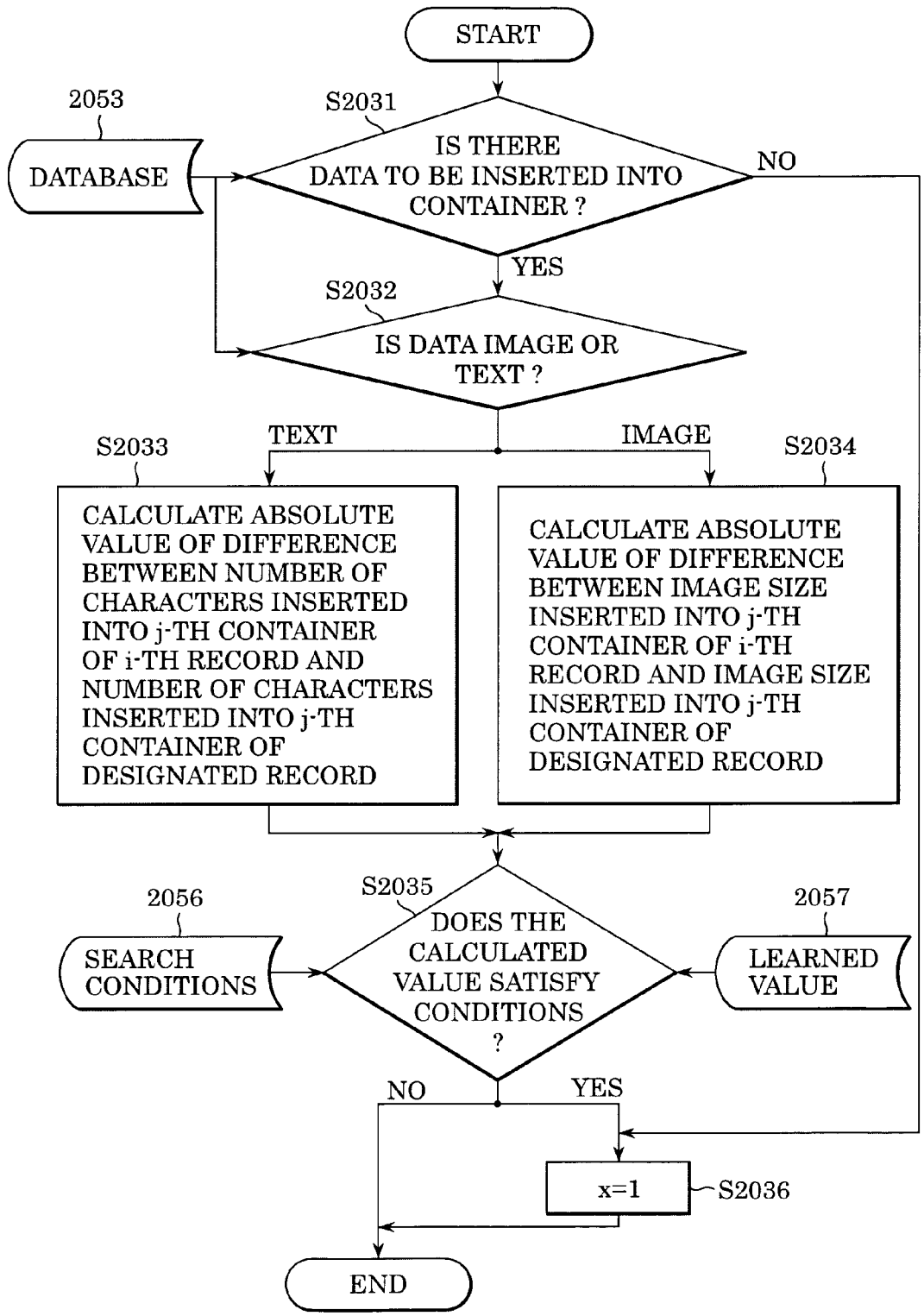

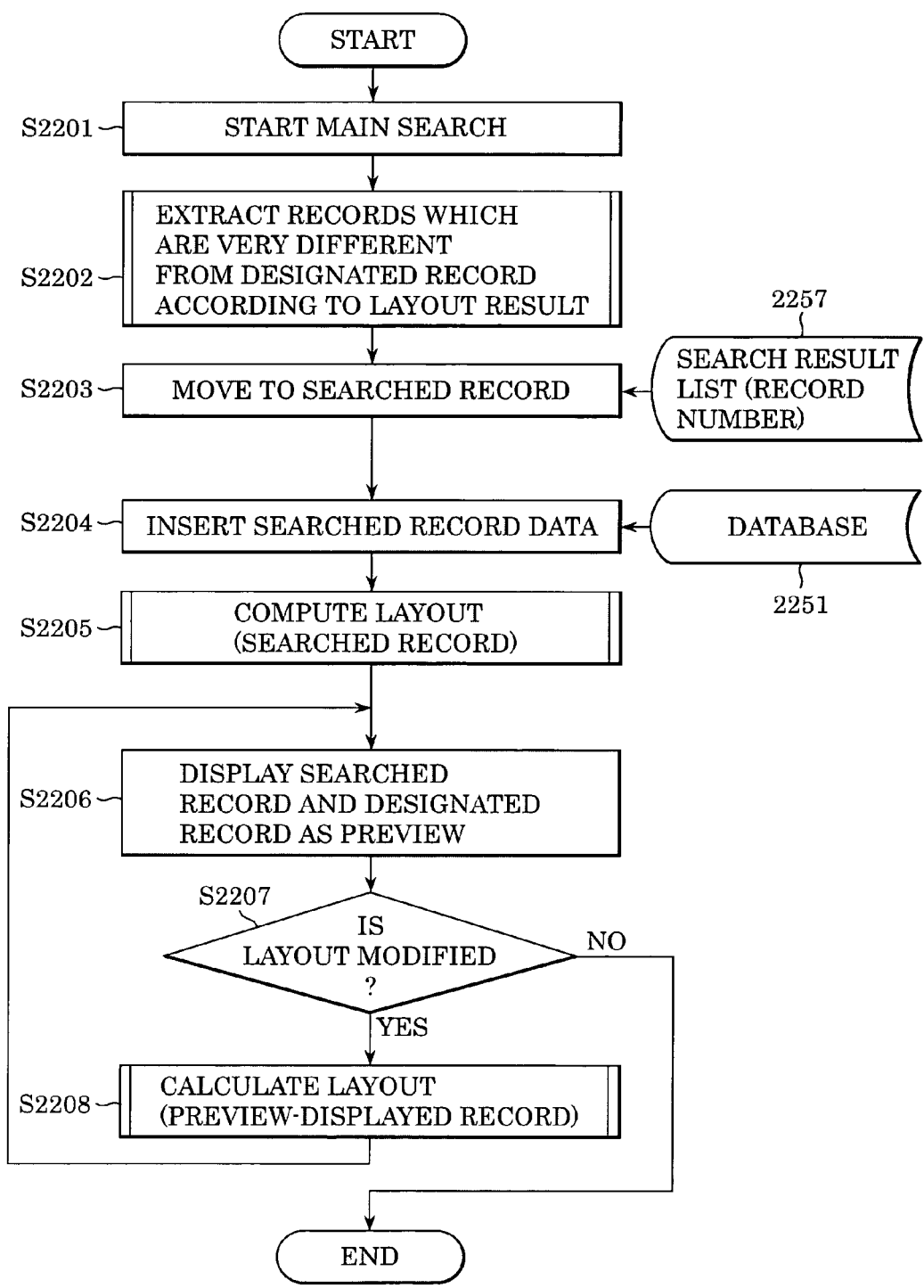

FIG. 26

DATABASE TABLE 1

| RECORD NO. | PRODUCT NAME CONCEPT | PRODUCT IMAGE | FEATURE 1 | FEATURE 2 | DESCRIPTION | |
|---|---|---|---|---|---|---|
| 0 | IXY Imagination Flexibility Performance | IXY 400.jpg | Switching between fast continuous photo-taking (about 2.5 images/sec.) and regular continuous photo-taking (about 1.5 images/sec.). About 5 photos for fast continuous mode and about 8 photos for regular continuous mode can be photographed. | Optimal white balance can be set for various light sources (Auto/sunlight/clouds/bulbs/fluorescent lamp/fluorescent lamp H/manual). | Auto-focusing AiAF. IXY DIGITAL 400 has 9 ranging points for various photographic scenes. Wide ranging points of finder achieve desired framing and high-precision focusing regardless of the subject position. Provided with center point AF for capturing subject at the center. | 1 |
| 1 | ..... | ..... | ..... | ..... | ..... | ..... |
| 2 | ..... | ..... | ..... | ..... | ..... | ..... |
| 3 | IXY L Style/ Quality/ Potential/ Operation | IXY L.jpg | Auto-focusing with 5 cross-shaped ranging points. Desired framing and high-precision focusing regardless of the subject position. Can be switched to center point (fixed) AF. | More sophisticated and pleasant IXY DIGITAL L in 4 colors. World's smallest camera (18.5mm, 100g) made of aluminum-magnesium alloy. | Minimum number of back buttons. Function button and cross button provide easy and comfortable operation. | ..... |
| 4 | ..... | ..... | ..... | ..... | ..... | ..... |

FIG. 27

| CONTAINER LIST ||
|---|---|
| CONTAINER NUMBER | CONTAINER NAME |
| 0 | CONTAINER A |
| 1 | CONTAINER B |
| 2 | CONTAINER C |
| 3 | CONTAINER D |
| 4 | CONTAINER E |

FIG. 28

| i | X COORDINATE | Y COORDINATE | DISTANCE (x+y) |
|---|---|---|---|
| 0 | 10 | 20 | 30 |
| 1 | 5 | 10 | 15 |
| 2 | ⋮ | ⋮ | ⋮ |
| ⋮ | ⋮ | ⋮ | ⋮ |
| n | ⋮ | ⋮ | ⋮ |
| SUM | 100 | 150 | 250 |

INFORMATION PROCESSING METHOD AND APPARATUS, AND COMPUTER-READABLE PROGRAM

BACKGROUND OF THE INVENTION

1. Field of the Invention

The present invention relates to information processing technologies for generating, editing, and printing documents formed of text or images. More particularly, the invention relates to an information processing technology for generating, editing, and printing variable data documents.

2. Description of the Related Art

The life cycle of commodities is becoming shorter because of the wider variation thereof, and due to the widespread use of the Internet, consumers are demanding more customized services. Because of these recent trends, the need for customer relationship management (CRM) and one-to-one marketing is becoming greater. This is one approach to meeting the needs of each customer and also to developing new customers and keeping them.

One-to-one marketing is one type of database marketing. In this marketing, personal attribute information, such as the user's age, gender, hobbies, favorites, and purchase history, is formed into a database and is analyzed to make suggestions to meet the customer's needs. A typical approach of this type of marketing is variable printing. Due to the recent progress of desktop publishing (DTP) technologies and the widespread use of digital printers, a variable print system for customizing and outputting documents for individual customers has been developed. Accordingly, it is demanded that the layout of content for different customers be optimally formed and displayed.

Hitherto, in this system, to form a customized document, a layout is formed on a document within a container (also referred to as a "field area" in a document form), and the layout is associated with a corresponding database. In this case, since the size of the layout container is fixed, a large amount of text data exceeding the fixed size cannot be completely displayed in the container. If such data is image data, it is displayed at a size smaller than the original image, or if it is displayed at the original size, the data cannot be completely displayed in the container.

To solve the above-described problems, Japanese Patent Laid-Open No. 7-129658 (paragraph [0049] and FIG. 8) discloses an automatic layout technique in which, when the size of a container is large, the size of the adjacent container is decreased. Japanese Patent Laid-Open No. 2000-155795 discloses a document recognition technique for checking an input image against a document form.

In the two publications described above, however, layout checking in an automatic layout system is not discussed. In the above-described variable print system for dynamically controlling the layout of a container in a field, to design an optimal template for all records, a certain record is selected to form a template. However, to check whether the layout of the template is suitable for other records, the operator must switch records to visually check the template. In this case, to check whether the layout is suitable for all records, the operator's visual check is required for each record. If the number of records is large, for example, 10000, the checking operation is very time-consuming.

SUMMARY OF THE INVENTION

In order to solve the above-described problems, the present invention provides an information processing technology for efficiently checking a basic layout against other layouts, which are very different from the basic layout, for all data records.

In order to achieve the above, the present invention provides an information processing method for assigning variable data input from a data source to partial display areas contained in a template so as to determine the size of each of the partial display areas based on the assigned variable data. The information processing method includes: an extracting step of comparing specified data for disposing the partial display areas at regular positions in a page with a plurality of items of stored data assigned to the partial display areas so as to extract an item of data that matches a designated extracting condition; a display control step of assigning the item of data extracted in the extracting step to the partial display areas so as to display a first layout of the partial display areas in the page together with a second layout based on the specified data; and a layout control step of modifying and displaying the second layout based on the specified data in accordance with a modification made to the first layout.

According to the present invention, layout results can be efficiently checked for all data records.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 20C is a flowchart illustrating details of step S2015 in FIG. 20B.

FIG. 20D is a flowchart illustrating details of step S2025 in FIG. 20C.

FIG. 22A is a flowchart illustrating the overall processing for main search.

FIG. 26 illustrates an example of a database illustrated in FIG. 20D.

FIG. 27 illustrates an example of a container list illustrated in FIG. 20C.

FIG. 28 illustrates an example of a positional information list.

DESCRIPTION OF THE EMBODIMENTS

The present invention is described in detail below with reference to the accompanying drawings through illustration of exemplary embodiments.

First Embodiment

Figure 1A:
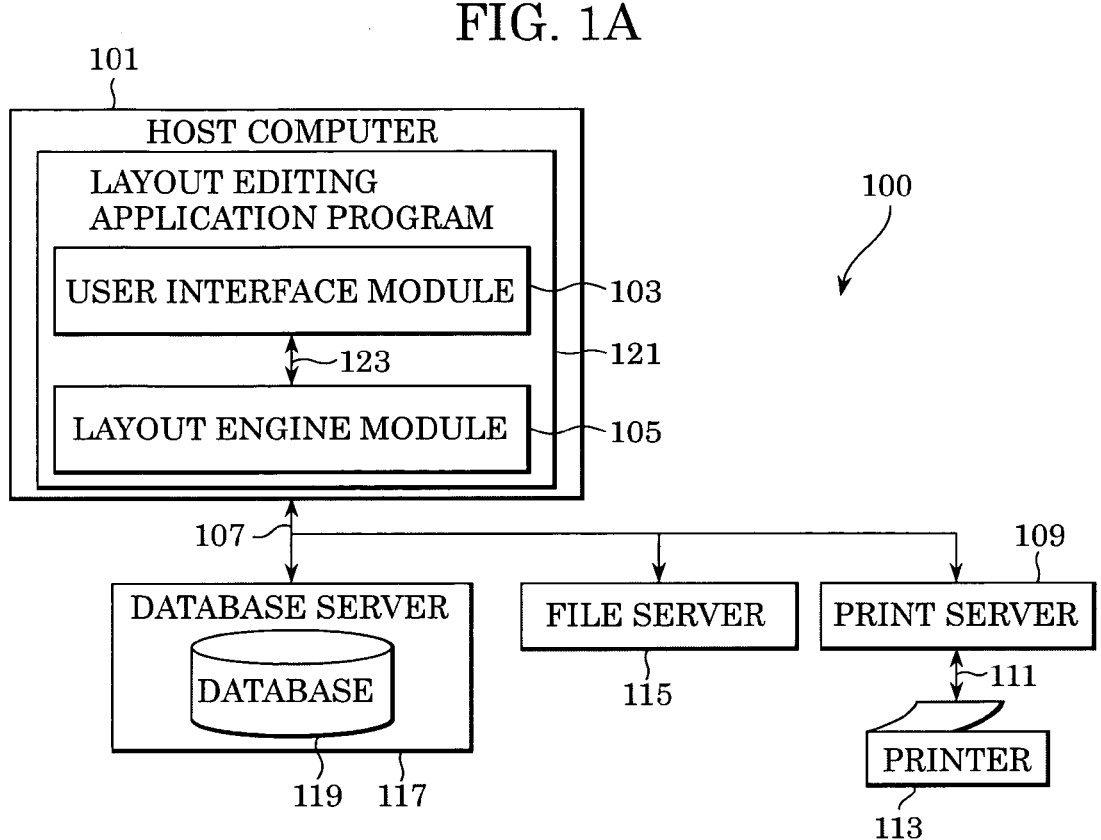
FIG. 1A is a block diagram illustrating a configuration of a computer system according to a first embodiment of the present invention.
Figure 1B:
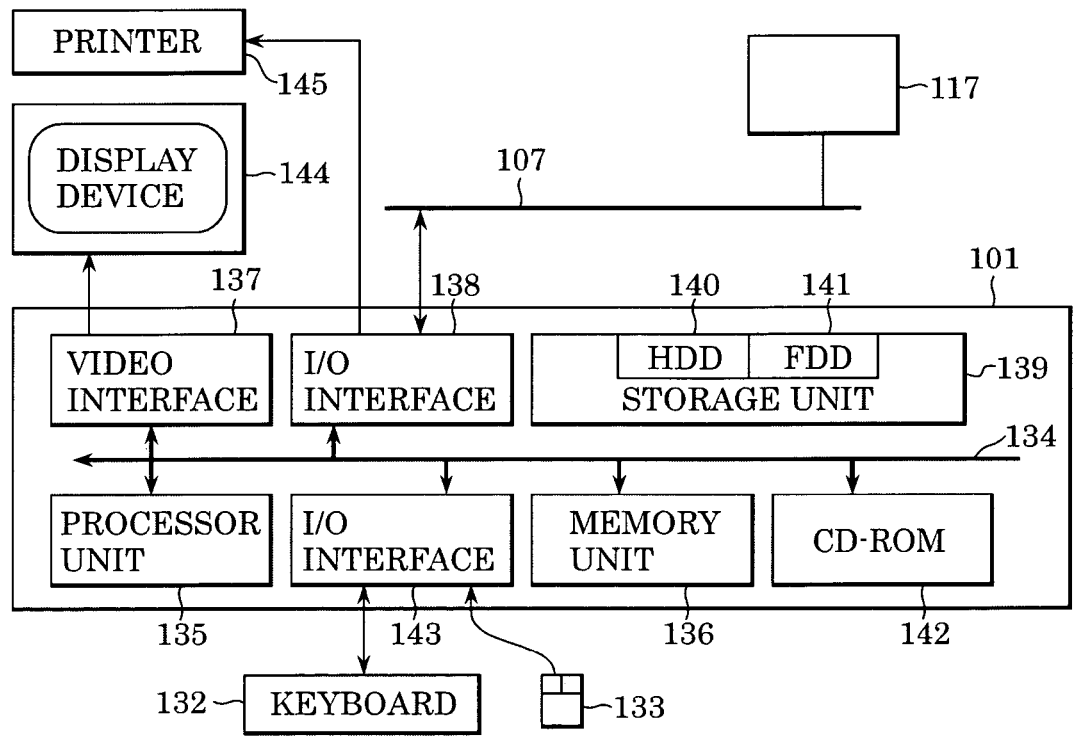
FIG. 1B is a block diagram illustrating a specific configuration of a host computer.
Figure 16:
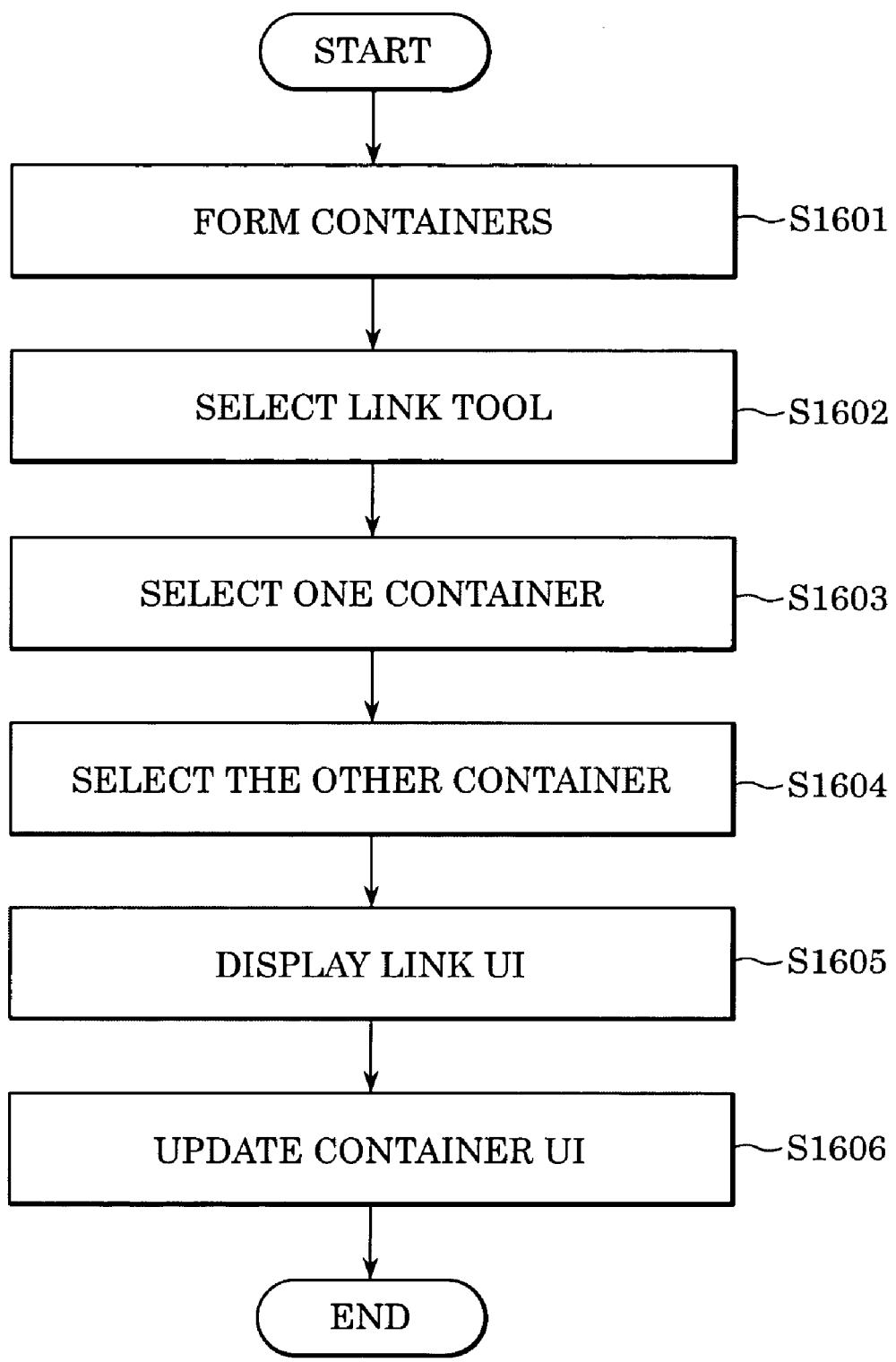
FIG. 16 is a flowchart illustrating a specific link setting method.

A system configuration is discussed first. A system 100 for printing documents by setting the container size to be variable is illustrated in FIG. 1A. The setting of the container size and links between containers in this system 100 is executed under the control of a host computer 101, which serves as a layout control device, shown in FIG. 1B. The process shown in FIG. 16 is executed by the host computer 101, and more particularly, by all or part of software, such as a layout editing application program 121 (program of the present invention), which is executable on the computer 100. In particular, layout editing and printing steps are executed by software under the control of the host computer 101.

Software is stored in a computer-readable medium including a storage device, which is described below, and is then loaded into the host computer 101 from the computer-readable medium and is executed. Such software or computer programs stored in the computer-readable medium or the computer-readable medium itself specifies the functions of the computer as a mechanism for executing processing, such as document-layout editing, computation or display control required for printing variable data, and content information processing, in cooperation with the computer.

The host computer 101 is connected to an input unit, for example, a pointing device such as a keyboard 132 or a mouse 133, and/or an output unit including a display device 144 and, if necessary, a local printer 145. An input/output (I/O) interface 138 connects the host computer 101 to a network 107 so that the system 100 can be connected to another computer (for example, a database server 117). A typical example of the network 107 is a local area network (LAN) or a wide area network (WAN).

The host computer 101 typically includes at least one processor unit 135, a memory unit 136, for example, a semiconductor random access memory (RAM) or a read-only memory (ROM), an I/O interface including a video interface 137, and an I/O interface 143 for the keyboard 132 or the mouse 133. A storage unit 139 includes a hard disk drive 140 or a floppy disk drive 141. A magnetic tape drive may also be used as the storage unit 139, though it is not shown.

A compact disc read-only memory (CD-ROM) 142 is provided as a non-volatile data source. The host computer 101 can use the I/O interface 143 via the processor unit 135, which performs communication via a mutual connection bus 134, by an operating system, such as GNU LINUX or Microsoft Windows®, or by an operation of a computer system formed in accordance with an operating system. An example of the system 100 including the host computer 101 shown in FIG. 1A is an IBM® PC/AT compatible or SPARCstation made by Sun Microsystems® Inc., or a computer system including such processors.

Residing in the hard disk drive 140, the layout editing application program 121 (hereinafter also referred to as "the application program" 121) is read by the processor unit 135 and is executed. The application program 121 is stored in the storage unit 139, and data fetched via the network 107 is stored in the hard disk drive 140 or the memory unit 136. The application program 121 is encoded on a CD-ROM disk or floppy disk and is read thereinto by the CD-ROM drive 142 or the floppy disk drive 141 before being provided to a user.

Alternatively, the application program 121 may be installed by the user via the network 107. Software may be loaded into the host computer 101 from a computer-readable medium with a suitable size, such as a magnetic tape, a ROM, an integrated circuit, a magneto-optical disk, a wireless device, infrared communication with another device, a computer-readable card, for example, a PCMCIA (Personal Computer Memory Card International Association (also called PC Cards)) card, e-mail communication, the Internet including recording information on a web site, or an intranet. The above-described computer-readable media are examples only, and the type of recording medium is not restricted thereto.

The layout editing application program 121, which is a program module for performing variable data printing (VDP), includes two software components. One module is a layout engine module 105. The layout engine module 105 reads each record of variable data stored in a database 119 according to restrictions of the size or position of a container (rectangular area), which is a partial display area into which data is input. The layout engine module 105 then calculates the size or position of the container from the read data and the restrictions of the container. The layout engine module 105, which operates as an application for determining the size or position of each container, outputs drawing information to a printer driver (not shown) so that the printer driver can draw an image of a variable data document to generate print data.

The other module of the layout editing application program 121 is a user interface module 103, which allows a user to form a document template and provides a mechanism for relating a data source with the container in the document template. The user interface module 103 and the layout engine module 105 can communicate with each other via a communication channel 123. A data source for forming documents is stored in the database 119 on the database server 117, which is formed by another computer operating a database application. The host computer 101 can communicate with the database server 117 via the network 107. For executing variable-data printing, the layout editing application program 121 generates a document template stored in a file server 115, which is formed by the host computer 101 or another computer. The layout editing application program 121 generates documents merged with data by using a document template. Such documents are stored in the storage unit 139 of the host computer 101 or in the file server 115, or are directly printed by a printer 113.

A print server 109 is a computer for providing a network function to the printer 113 which is not directly connected to a network. The print server 109 and the printer 113 are connected to each other via a typical communication channel 111.

Figure 2:
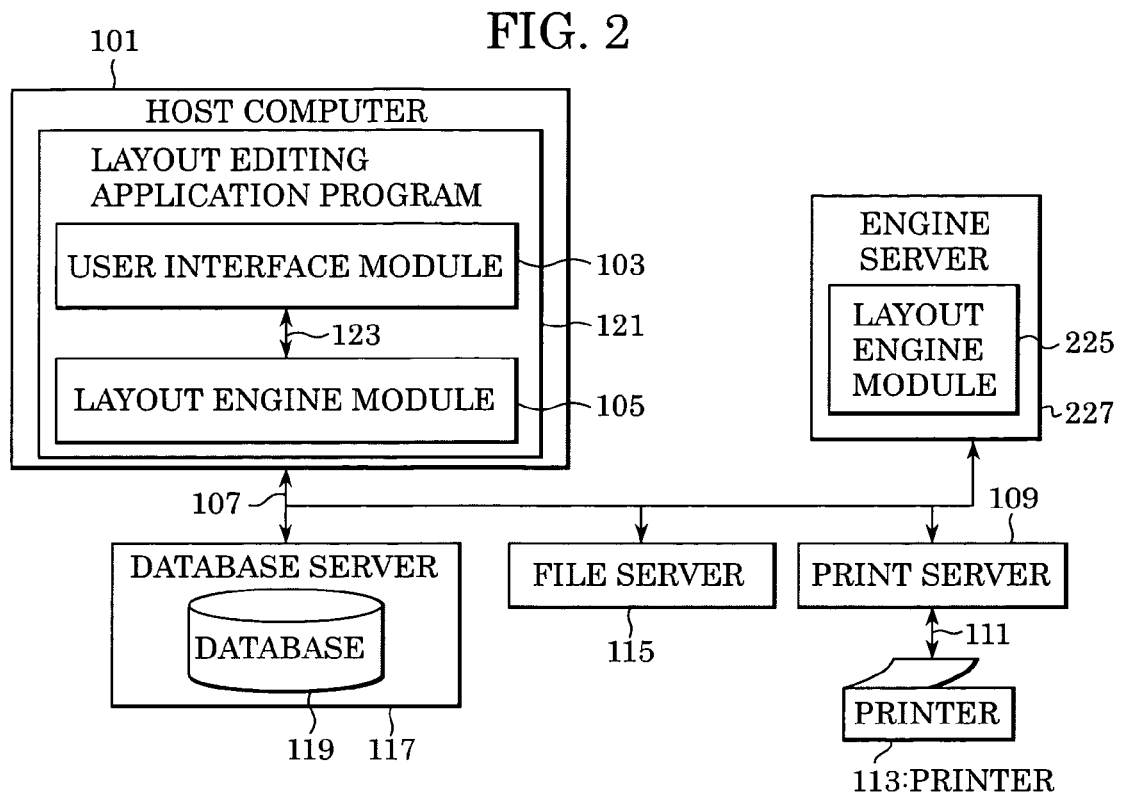
FIG. 2 is a block diagram illustrating another configuration of the computer system in which a layout engine module is provided not only for the host computer, but also for an engine server.

FIG. 2 illustrates another configuration of the system 100 in which a layout engine module 225 is also provided for an engine server 227. The engine server 227 is formed of a typical computer, and when an operation, for example, printing, is performed on a document template stored in the file server 115, it can be coupled with data stored in the database 119 so that the layout engine module 225 can generate the corresponding document. Such an operation is input via a user interface (UI) screen under the control of the user interface module 103 so that only a specific record can be printed.

Figure 3:
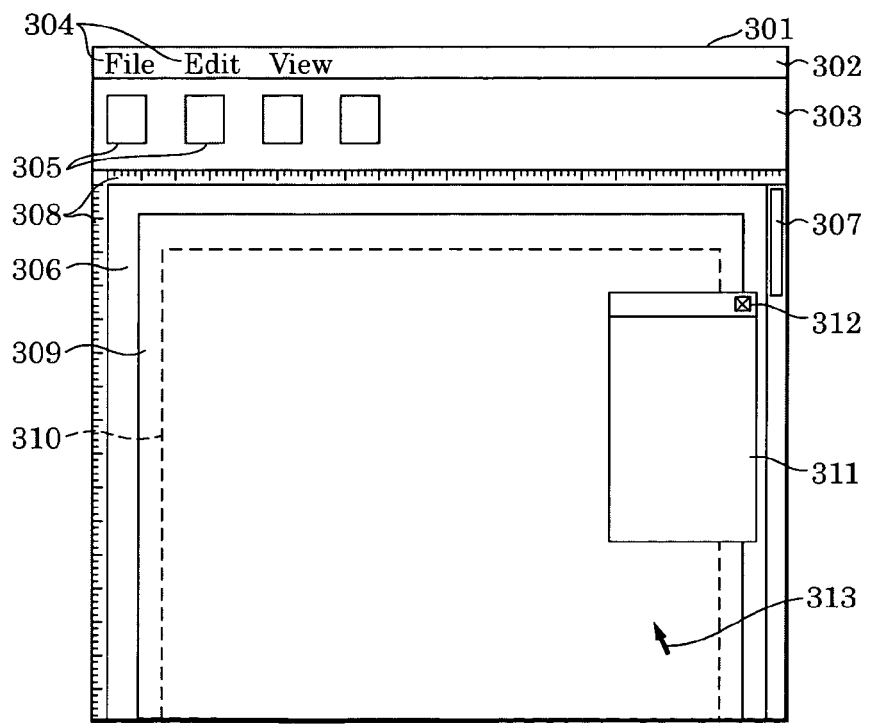
FIG. 3 illustrates a user interface screen including a menu bar, a tool bar, a work area, and a floating palette.

An application window 301 shown in FIG. 3 is displayed on the display device 144 by the user interface module 103 (FIG. 1). The application window 301 includes a menu bar 302 and a tool bar 303, which can be hidden or moved to various places on the screen, a work area 306, an optional palette 311, and a cursor/pointer device 313, which can be moved based on the position or operation of the mouse 133.

As is known, the menu bar 302 has menu items 304 that can be pulled down based on the category of menu options, and the tool bar 303 has tool buttons 305 that can be displayed or hidden in specific application modes. Optional rulers 308 are used for specifying the positions of pointers, pages, lines, margin guides, containers, or objects in the work area 306. The palette 311 is used for accessing additional functions, such as a variable data library, and is provided with a button 312 for providing a window control function for moving, resizing, and closing the window. The palette 311 can be displayed at the front of the work area 306 or may be hidden behind the work area 306. The display of the palette 311 may be restricted to the inside of the application window 301, or may be extended partially or entirely outside the application window 301.

Figure 4:
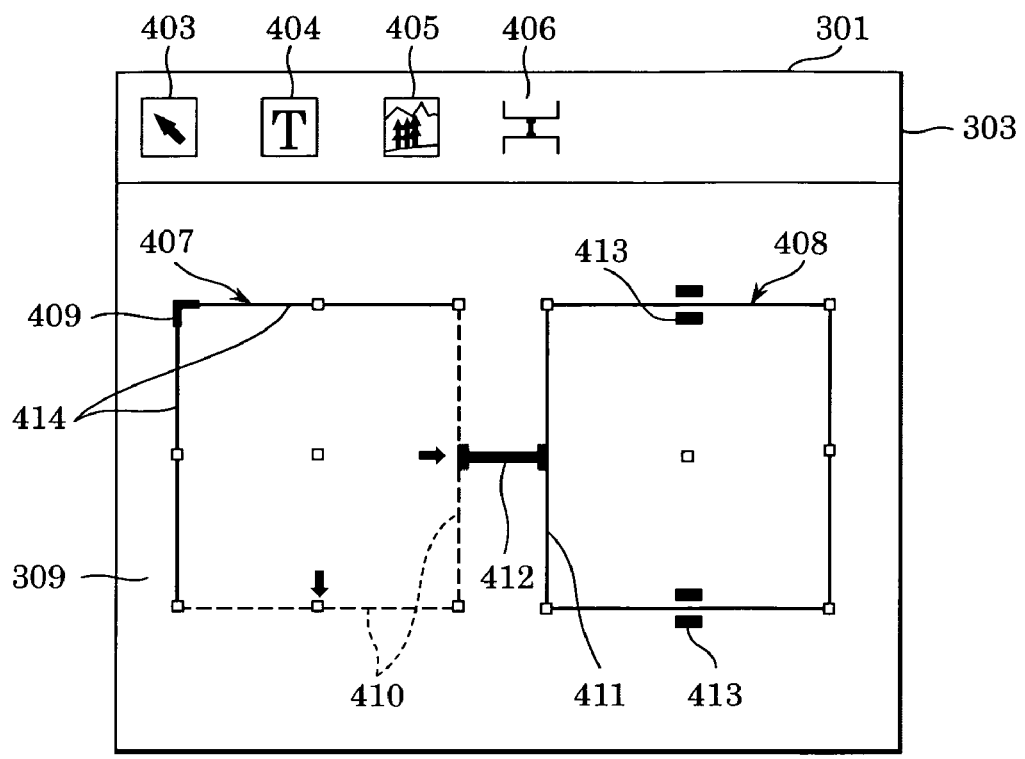
FIG. 4 illustrates typical containers provided with a link between the containers, anchors, and sliders.

The tool bar 303 includes at least buttons 403 through 406 shown in FIG. 4 that can be selected by the user. Details of the buttons 403 through 406 are as follows.

The selection tool button 403 is used for selecting or moving the sides of a container, changing the size of a container, or locking or unlocking a container. A plurality of containers can be selected by dragging the peripheries thereof or by pressing the CTRL key while selecting the plurality of containers. The text container tool button 404 is used for generating containers having static or variable text. The image container tool button 405 is used for generating containers having static or variable images. The link tool button 406 is used for forming links for associating containers and also for controlling the distances between the links.

The buttons 403 through 406 are implemented as icons that are changed according to the operation state, as is known in the art. In the application window 301 of the layout editing application program 121 shown in FIG. 3, the user can determine a basic layout by forming containers or links therebetween in one page. The basic layout serves as a base for variable data printing. If all of containers in the basic layout are fixed containers, the printing results of all records become the same. If containers in the basic layout are variable containers, the sizes or positions of such containers become variable within the range of restrictions according to the amount or size of data of each record. Accordingly, a document template formed by the layout editing application program 121 merely determines the basic layout, and if the basic layout includes a variable container, the final layout of printed matter is adjusted by the data read into the application window 301.

The work area 306 shown in FIG. 3 is used for displaying or editing the design of a document template. Accordingly, the work area 306 serves to show a draft document printed by the user and allows the user to understand how a merged document is changed according to the amount or size of the variable data. When an external database is linked to the template, variable text or image data can be displayed in the containers so as to allow the user to preview a current document. The structure of a document and a variable data container can always be displayed when the cursor is moved over the container or when the container is selected.

The work area 306 is characterized by a scroll bar 307, the optional rulers 308, and a document template 309. The document template 309 can show that there are plural pages. The page size of a given document template is designated by the user, as in the known art. For example, the user selects "page settings" from a "file" menu so as to display a dialog for setting the page size, and then specifies the page size, which is then reflected as the page size of the document template. The actual number of pages in each document may be changed according to the variable data. If the variable data cannot be contained in one page and if there are no restrictions in the basic layout so as to accommodate containers within one page of a predetermined paper size, additional pages can be automatically created. If there are restrictions in the basic layout such that containers must be accommodated within one page of a predetermined paper size (which can be set by an anchor icon, which is described below), the containers are rearranged within the page so as to determine the sizes and positions of the containers. If necessary, the size of input variable data is reduced, and the layout for each record is dynamically created.

The boundaries indicated by the broken lines in FIG. 3 are page margins 310, which indicate the maximum size of an object that can be printed and can be set to a desired size. FIG. 4 illustrates an example of an object that can be displayed in one page on the document template 309. In FIG. 4, a plurality of containers 407 and 408 are shown, and the relationship therebetween is defined by an anchor icon 409 which fixes the positions of sides 414 of the container 407, unfixed sides 410, a link 412, and sliders 413. The anchor icon 409 can be set at a corner, a side, or the center of the container. When the anchor icon 409 is set, the positions of the corresponding portions around the anchor icon 409 are fixed. That is, in the example shown in FIG. 4, since the anchor icon 409 is set at the top left corner of the container 407, the container 407 is extendable to the right or downward if the image or text size of input variable data is large. If the anchor icon 409 is set at one side, that side is fixed, and the container is extendable in the directions of the other three sides. If the anchor icon 409 is set at the center of the container, the container is extendable in the four directions while maintaining the central position of the container. Although details are given below, the link 412 indicates that the containers 407 and 408 are associated with each other and that the container 408 is movable to the right while maintaining the lengths set in the link 412. The sliders 413 indicate that the container 408 is movable in parallel with the corresponding sides.

Details of containers are given below. Containers are input in units of records from a variable data file into a document template in the form of fixed or variable text or images. A container is a space to be drawn, which is referred to as a "partial display area", and is formed with another container or object, as shown in FIG. 4. Containers are moved or reformed, or the sizes thereof are adjusted by the operation of the mouse 133 in response to an instruction from a user input via a user interface screen.

Conditions of constraints concerning the reshaping of containers are defined by the anchor icon 409, the link 412, and the sliders 413. The containers are reshaped in the direction allowed according to the amount of text or image data, and the layout of the text data or image data in the container is then determined. If it is necessary that the two containers be reshaped, the reshaping of the containers is controlled so that the configurations of the containers are well balanced according to the amount of text data or image data to be accommodated in the containers.

The positions of containers in the work area 306 can be specified by the operation of the mouse 133, which serves as a pointing device. The containers can be moved, or the size thereof can be adjusted within the screen (FIG. 3), which serves as a user interface, and new containers can be added. Various conditions concerning the reshaping of containers, for example, mutual relationships between containers, are set by anchor icons, links, and sliders. The container has the functions of visually representing content, providing interaction between containers, and editing information in containers. The definition of containers is as follows.

(1) Fixed or variable content is input into containers. Variable content is considered to be dynamic because data is fetched from a data source and the container size is varied according to document data. Variable content does not contain animated content or temporally variable content since such content is not suitable for being printed. Similarly, fixed content for all documents generated by using containers is always displayed in the same way. However, if fixed content is linked to variable content, it is displayed differently in each document according to the operation of variable content.

(2) Containers have an accessory function for setting text, such as background colors, borders, and font styles, to be used for content. Such settings are referred to as "container attributes". A container attribute may be set for each container, or the same container attribute may be set for a plurality of containers.

(3) To generate a document, a container is merged with data from a data source. For any fixed content, the above-described accessory function is applied and such accessories are then viewed when a document is printed. For variable content, specific data is fetched from a data source and is then displayed. That is, the container size is changed for the specific data according to the conditions set in the container. The layout of the container and data representation in the container can be printed by the printer 113 or displayed on the display device 144, or may be processed by using both the printer 113 and the display device 144.

(4) For setting containers, the user interface module 103 edits or sets the display of containers by using an interactive graphical user interface (GUI). User interface elements are displayed on the display device 144 although they are not printed on a document. The user interface module 103 can display accessories, such as background colors and fonts for containers, on the interface screen, and reflects such accessories in the setting, editing, or displaying of the containers.

(5) Additionally, the user interface module 103 can set the border between containers or an icon at a corner of a container for interactively changing or displaying the size or the position of the container. The user interface module 103 can also set the operation of a container, for example, setting of icons or text editing, when data from a data source is merged with the container.

For displaying content in each document, there are constraints for linking a container with content and displaying them. Because of these constraints for linking a container with fixed or variable content, the user can control many documents by using a single document template. Examples of the constraints are: the maximum height of content is 4 inches, or the left edges of content in the containers should be displayed at the same horizontal position in each document. Such constraints can be set by using a GUI and can be reflected when displaying or editing containers.

As the positions of images are defined on a page, the position of content can be specified. Each container has its own position and size. This allows content to be displayed or edited in variable-data printing under the condition for setting the layout of a container according to the type of content inserted into the container. The user can designate the size and position of document content by using the corresponding container. Since plural documents are generated from a document template, the user can specify constraints for a container by using the user interface module 103.

The sides of one container define imaginary boundaries for displaying related content in a document. For example, the left side of a rectangular container defines the left-side position of the related content. Similarly, the height of a container defines the height of the related content.

In the following description, the term "fixed" for defining certain values for restricting the display of content applies to all documents.

(1) If the width of a container is fixed, the width of related content is the same for all documents.

(2) If the height of a container is fixed, the height of related content is the same for all documents.

(3) If the distance is fixed, it applies to all documents.

(4) If the left and right sides of a container are fixed, the height or the vertical position of the container can be changed to accommodate content therein.

(5) If the top and bottom sides of a container are fixed, the width or the horizontal position of the container can be changed to accommodate content therein.

(6) The vertical axis of a container is an imaginary vertical line positioned at the center of the container in parallel with the left and right sides of the container. When the vertical axis of a container is fixed, the average of horizontal positions of the left and right sides of containers is the same for all documents. Because of this constraint, the width of a container may be changed, and as a result, the container may be closer to or farther away from the vertical axis. However, the horizontal position of the vertical axis is the same for all documents. The height and horizontal position of a container are not influenced by this constraint.

(7) Likewise, when the horizontal axis is fixed, the vertical position and the horizontal length of the top or bottom side are restricted. However, the height of a container is not influenced by this constraint.

(8) When both the horizontal and vertical axes are fixed, the central position of a container is fixed. However, the width and the height of a container are not influenced by this constraint.

(9) When a corner of a container, the intermediate position of a side of the container, or the central position of the container is fixed, data is displayed at the same place with the same size while being related to that container in all documents. For example, if the top left corner of a container is fixed, the top left position of the container is the same for all documents.

(10) A vertical side or the vertical axis can be fixed by being related (linked) to the left or right side of a page, the left or right page margin, or another horizontal position (for example, a guide line). Similarly, a horizontal side or the horizontal axis can be fixed by being related (linked) to the top or bottom side of a page, the top or bottom page margin, or another vertical position (for example, a guide line).

The opposite term of "fixed" is "variable", which means that a side, an axis, a corner, or the central position of a container may be changed or that document constraints between documents (records) may be changed. For example, the user expects that the layout of a document in a page can be dynamically changed according to the size or amount of variable data. For specific containers, however, the user may wish to fix the size or the position of such containers, or fix the four corners of containers positioned at the corners of a page. Accordingly, the layout editing application program 121 can set whether a side, an axis, a corner, or the central position is fixed or variable for each container (partial display area). This allows the user to form a basic layout for the document template 309 as desired.

There are two types of containers, i.e., text containers and image containers. The text containers have text and embedded images, while the image containers have only images. As is shown in FIG. 4, a new text container or image container is created in the document template 309 by clicking the text container tool button 404 or the image container tool button 405, respectively, with the mouse 133, and by dragging a corresponding rectangle to the document template 309. A container is created by clicking the document template 309 with the mouse 133 after activating the corresponding tool 404 or 405. A dialog box or another prompt is provided for inserting a container with a default size or for determining the dimensions of a container. A container is automatically predefined and is created by a calculated schemer, and is disposed in the document template 309. The user can select the generated container with an input unit, such as the mouse 133, and right-click the selected container to specify the property. Then, the property dialog for containers is displayed so that the user can set constraints for the container. By using a container property dialog UI, which serves as partial display area setting mechanism, the above-described various constraints can be set. In the container property dialog, the size (width and height) and the position of a container can be set. If the size of the container is to be variable, the basic pattern (basic size and reference position) is set, and then, the maximum container size (width and height) and the minimum container size (width and height) can be set.

Display operations for containers are discussed below. FIGS. 5A through 5D illustrate examples of rules for displaying containers. The layout editing application program 121 draws sides of a container with solid lines 503 or broken lines 504. The container includes anchors (lines, configurations, and icons, such as those indicated by 506, 507, and 509), handles 502 (control points, which are disposed near the sides or in the container, for moving or modifying the container), the sliders 413 (short parallel lines across the sides of the container, such as those shown in FIG. 4), extending/shrinking icons 505, and colors.

Rules for displaying containers shown in FIGS. 5A through 5D are as follows.

1. Sides of a container are drawn by solid lines.
2. If the width is fixed, the left or right sides are drawn by solid lines.
3. If the height is fixed, the top and bottom sides are drawn by solid lines.
4. Axes are not drawn.
5. Any side which is not drawn is indicated by broken lines, and extending/shrinking icons are drawn near the broken lines.
6. If a vertical side and the intersecting side or the vertical axis and the intersecting axis are fixed, an anchor is drawn at the corresponding intersection.
7. If no anchor is drawn for any fixed side, a slider is drawn at the center of the corresponding edge.
8. If no anchor or slider is drawn for a vertical side and the intersecting side or the vertical axis and the intersecting axis, a handle is drawn at the corresponding intersection.

The lines defined in rule 1, 2, or 3 are drawn by solid lines since they are fixed or restricted. Variable lines defined in rule 5 are drawn by broken lines. For fixed points defined in rule 6, 7, or 8, anchors are indicated, sliders are indicated for some fixed sides, and handles are indicated for other points.

If the user sets constraints later, preference is given to such constraints over the above-described rules. That is, if another constraint is set and influences the sides to be drawn defined by the above-described rules, sides indicated by the solid lines or broken lines are changed.

The positions of variable sides are dependent upon the content in a container. To determine the positions of variable sides, "dynamic calibration", which means that content is merged with a document template and is viewed by a user interface, is used. Alternatively, the positions and sizes of containers can be determined by using content areas that are averaged in the documents of all records, thus determining the layout of the variable sides via a user interface. The layout editing application program 121 can control the display of containers according to the above-described rules.

Content can be viewed when being inserted into a variable container which can be changed according to the settings of anchor icons or slider icons disposed at or near the sides of the container. Specific icons set for a container and the sides of the container function in the following manner.

Broken lines, such as the sides 410 shown in FIG. 4, indicate that they can be moved in a document according to the content to be inserted into the container. The solid lines 414 indicate that the positions thereof are fixed.

Anchors indicate that the corresponding intersecting sides or axes are fixed. The icon 409 is an example of an anchor icon indicating that the intersecting sides 414 are fixed.

Sliders indicate that the corresponding sides are fixed in the vertical direction but can be moved horizontally. The width and height are indicated in the sub dialog window under the control of the layout editing application program 121, and a basic pattern including the basic value, minimum value, and maximum value within the allowance of the container size can be set.

Figure 5A:
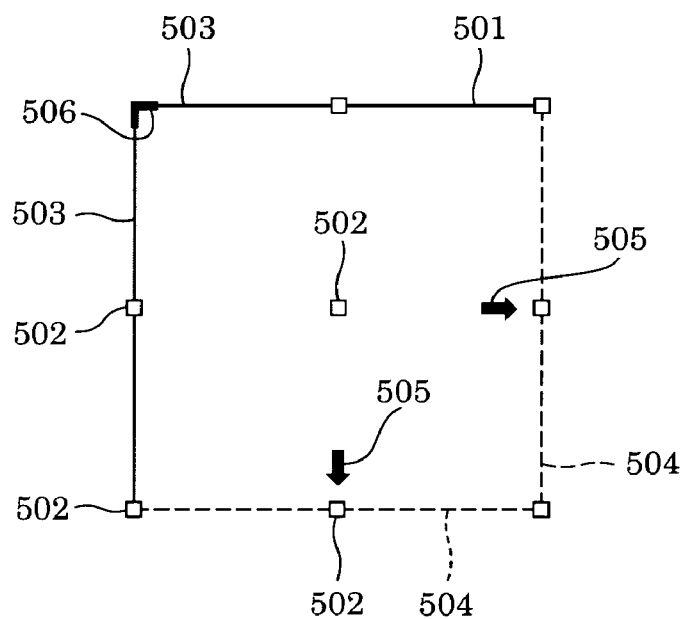
FIGS. 5A through 5D illustrate examples of rules imposed on sides of containers.

In a container 501 shown in FIG. 5A, the sides 503 indicated by the solid lines are fixed, while the sides 504 indicated by the broken lines are variable along the width and the height. The extending/shrinking icons 505 indicate that the adjacent sides 504 are variable.

Figure 5B:
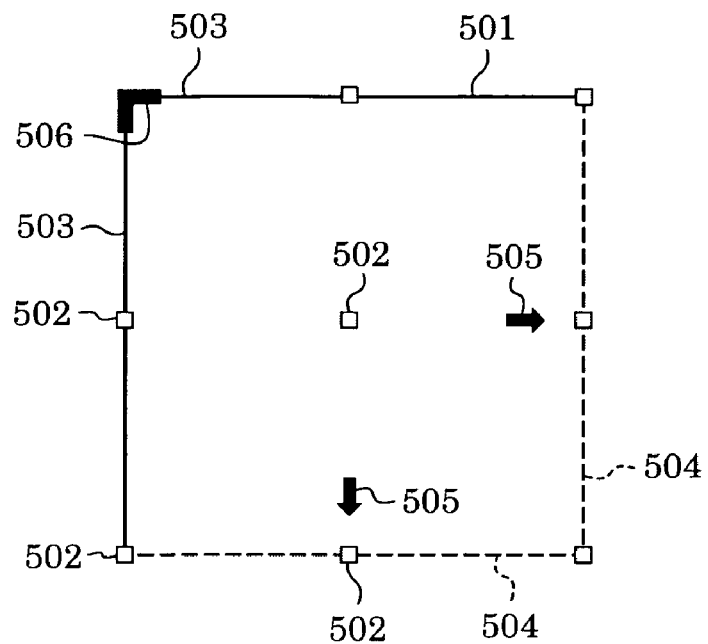

In the container 501 shown in FIG. 5B, the sides 503 indicated by the solid lines are fixed, and the anchor icon 506 indicates that the movement of the sides 503 is restricted along the width and the height.

Figure 5C:
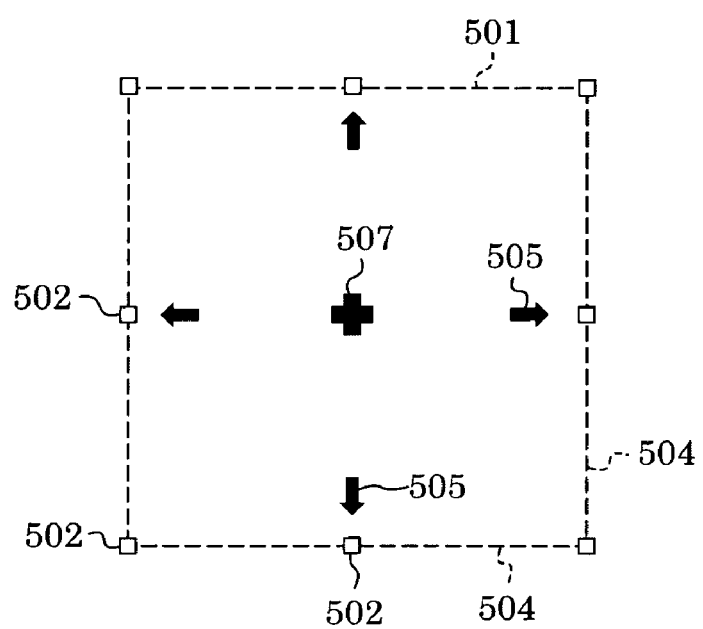

The container 501 shown in FIG. 5C is set to be extendable and shrinkable equally along the width and the height around the central point indicated by the anchor icon 507.

Figure 5D:
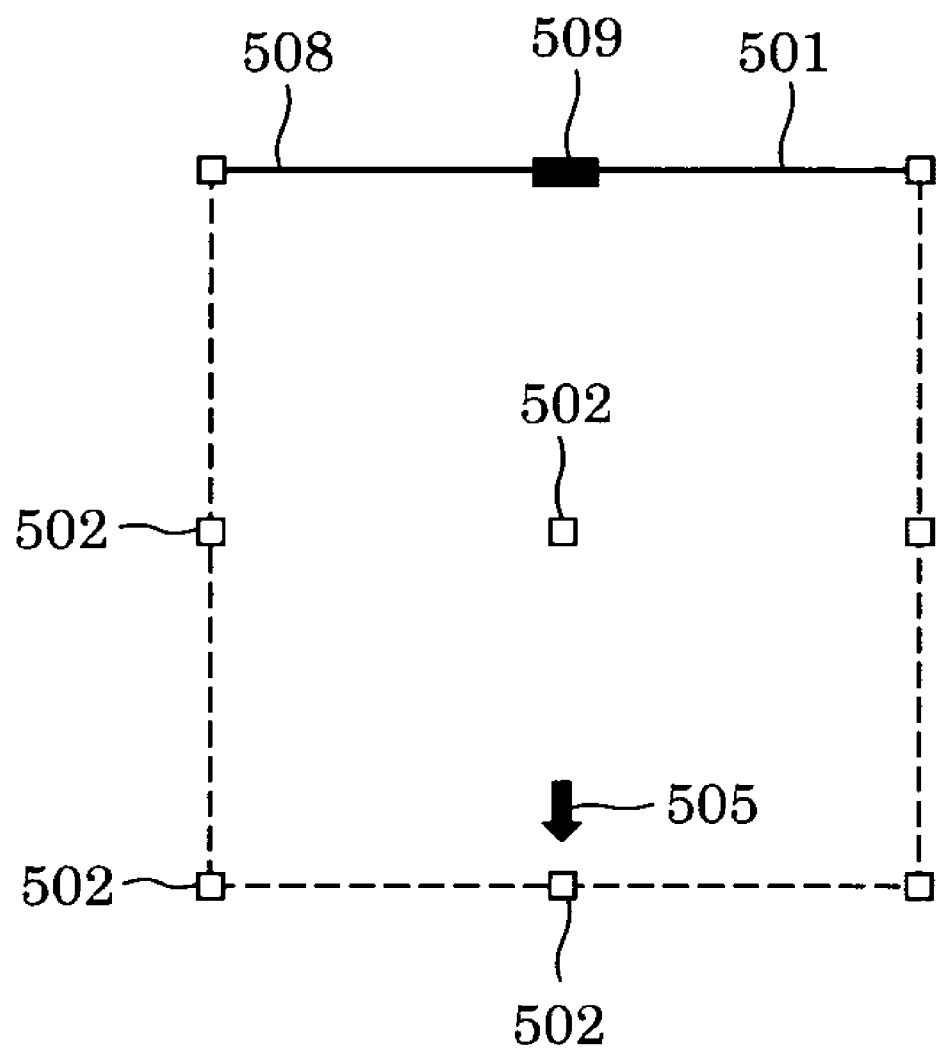

In the container 501 shown in FIG. 5D, a top side 508 with the anchor icon 509 is fixed, while the sides indicated by the broken lines with the handle icons 502 are variable along the width and the height. In this case, the sides indicated by the broken lines can be changed vertically and horizontally with respect to the central axis (vertical axis) passing through the anchor icon 509, thus changing the container size. The layout of the container is adjusted so that the anchor icon 507 is always positioned at the center of the container 501.

Figure 6A:
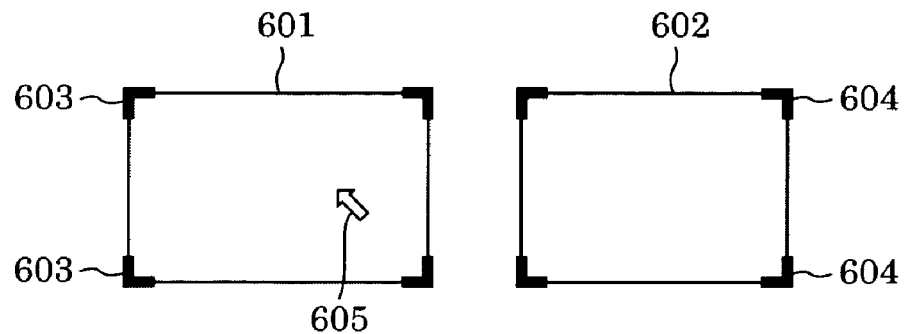
FIGS. 6A through 6C illustrate an example of a user interface screen when containers are linked.
Figure 6B:
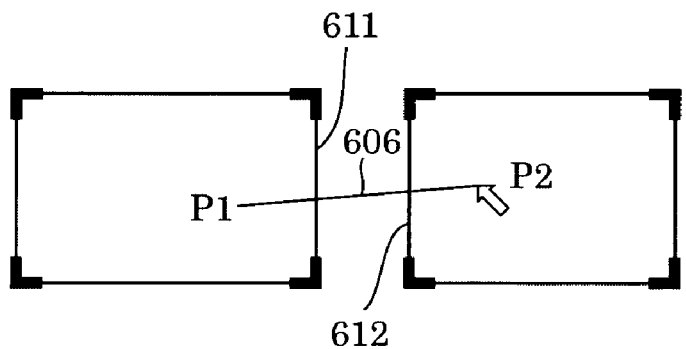
Figure 6C:
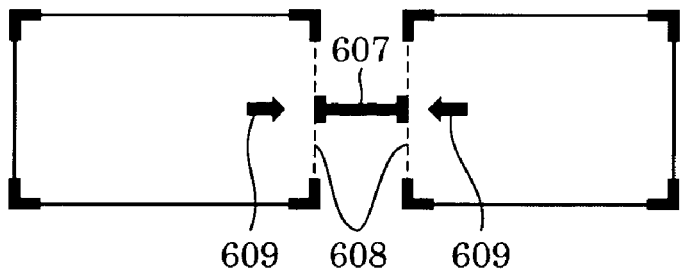

FIG. 16 is a flowchart illustrating a link setting method performed by the layout editing application program 121. FIGS. 6A through 6C illustrate display examples of the user interface. An operation for setting a link between containers is described below with reference to FIGS. 6A through 6C and 16. In step S1601 of FIG. 16, at least two containers to be linked are formed. FIG. 6A illustrates that two containers 601 and 602 have been formed.

Then, in step S1602, the link tool button 406 (FIG. 4) is selected. The containers 601 and 602 shown in FIG. 6A correspond to the containers 407 and 408 shown in FIG. 4, and the containers 601 and 602 are defined by the fixed sides indicated by the solid lines. Icons 603 and 604 are the same anchor icons as the icon 409 shown in FIG. 4, and a mouse pointer 605 is also shown in the container 601.

In step S1603, a container is selected. This can be performed by clicking one of the containers to be linked, for example, the container 601, with the mouse 133. Then, in step S1604, the other container (in this case, container 602) to be linked is clicked with the mouse 133 to complete the selection of the containers.

A segment 606 (in FIG. 6B) represents a schematic path of the mouse 133 for connecting the position (P1) of the container 601 clicked with the mouse 133 in step S1603 and the position (P2) of the container 602 clicked with the mouse 133 in step S1604. That is, a link UI is displayed in step S1605. A link 607 is set between a side 611 and a side 612 which intersect with this segment 606. In step S1606, the interface screen with the link 607 set between the containers 601 and 602 is updated. Since the link 607 has been set, the screen for displaying the containers 601 and 602 is automatically switched to that shown in FIG. 6C. In the screen shown in FIG. 6C, sides 608 become variable, as indicated by the broken lines. The fixed sides 611 and 612 are switched to the variable sides 608 because they have to be variable by the setting of the link 607. If all of the sides are fixed in spite of the setting of the link 607, the relative relationship between the containers 601 and 602 cannot be specified by the link 607. This processing is automatically executed under the control of the layout editing application program 121.

The function of icons 609 in FIG. 6C is similar to the icons 505 shown in FIG. 5, and the icons 609 visually show the user the directions in which the containers 601 and 602 can be moved by the setting of the link 607. Although in the example shown in FIG. 6C the right side of the left container 601 and the left side of the right container 602 are variable, this is an example only. The side 608 of the left container 601 may be varied by the sliders 413 shown in FIG. 4. The above-described processing can be executed under the control of the layout editing application program 121.

The layout editing application program 121 of this embodiment includes a layout mode and a preview mode. In the layout mode, a layout is formed by generating containers by using the user interface module 103 and by setting a link between the containers. In the preview mode, records from a data source are inserted into the layout formed in the layout mode, and the resulting layout is previewed by using the layout engine module 105. In this preview mode, actual records are inserted, and the layout is computed according to the above-described priority. In the preview mode, however, the layout to be computed is a layout to be displayed. The layout engine module 105 also computes a layout to be printed by inserting data into each container. In this case, the layout to be printed is computed as in the layout to be displayed.

Figure 10:
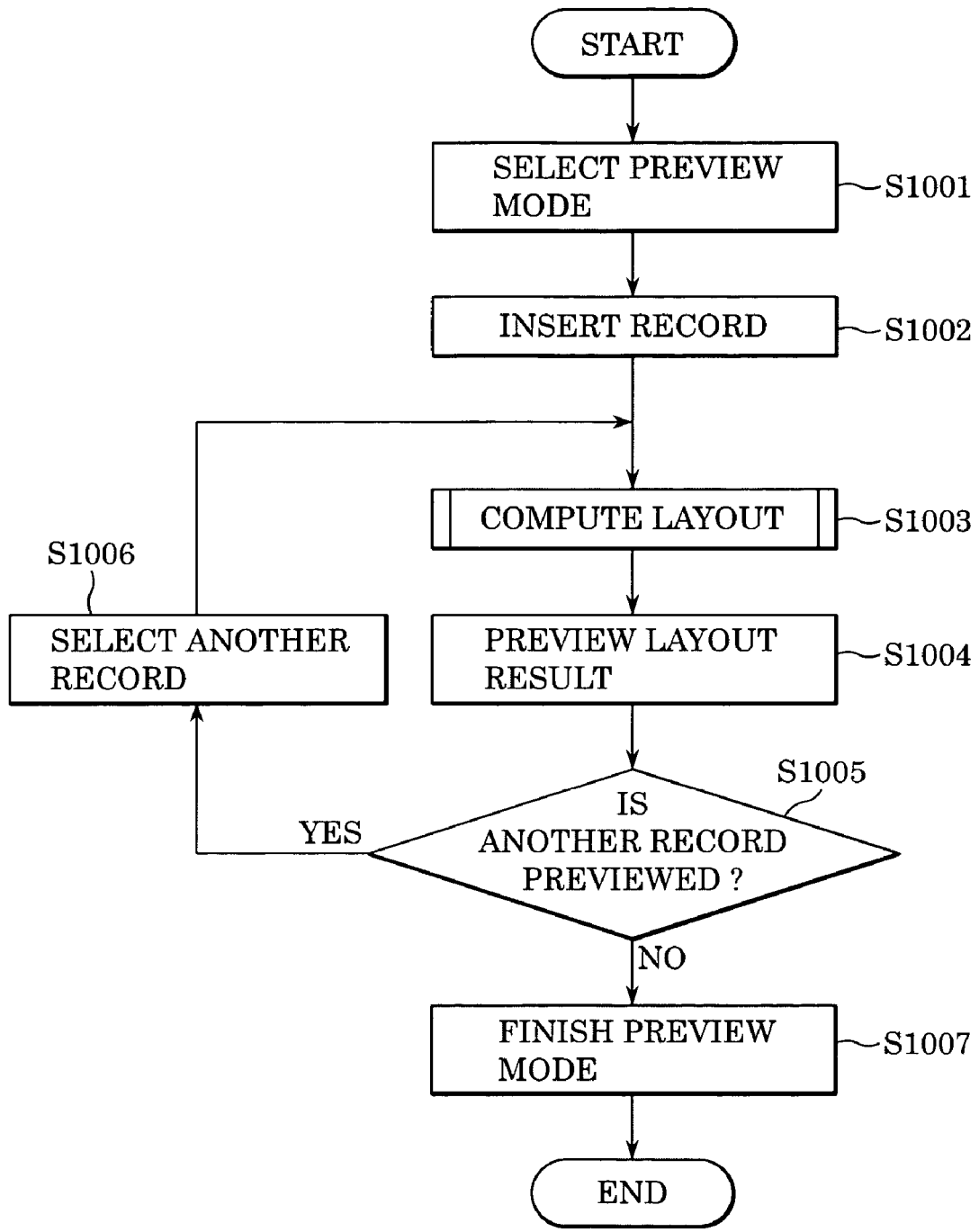
FIG. 10 is a flowchart illustrating layout computation.
Figure 11:
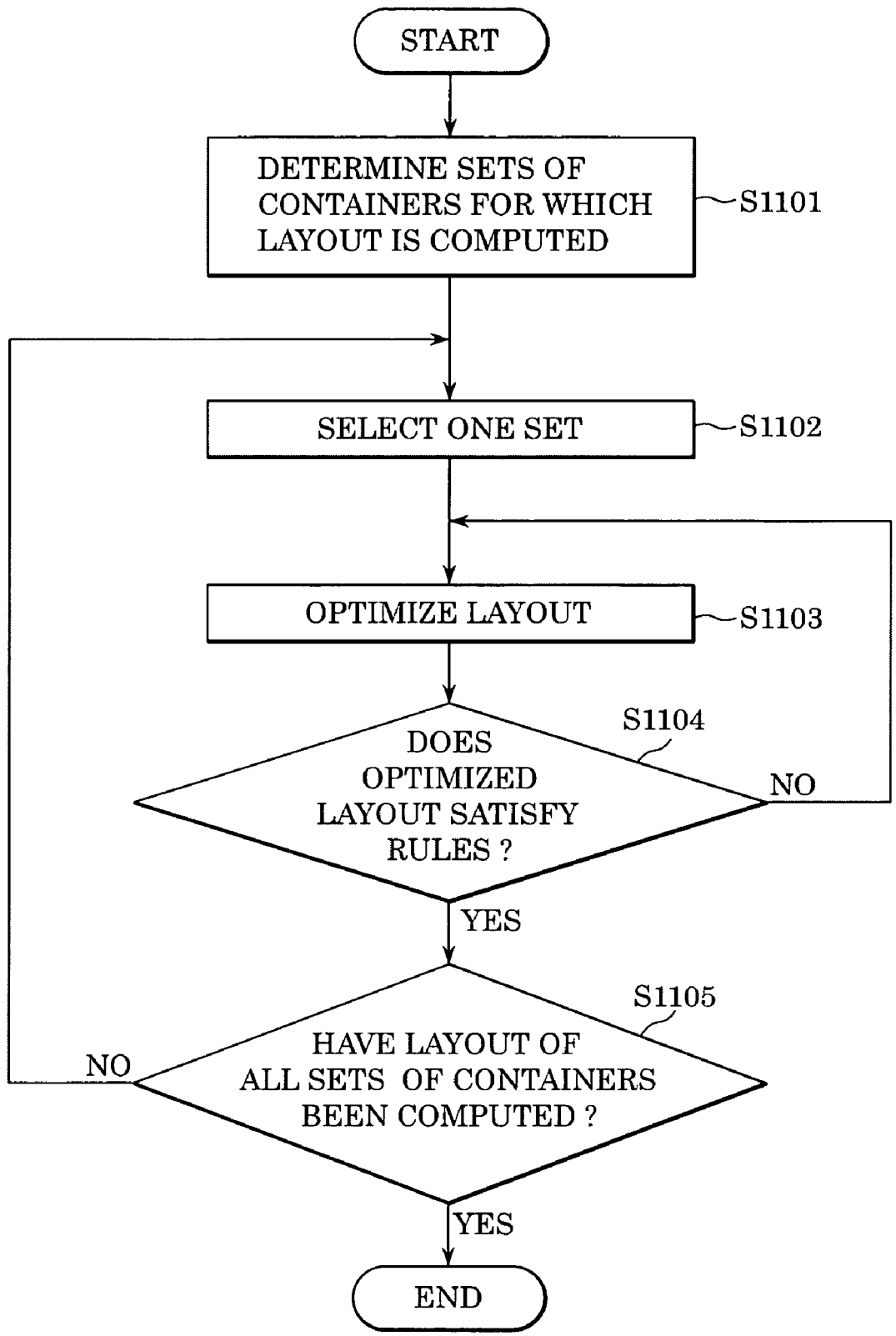
FIG. 11 is a flowchart illustrating details of the layout computation.

FIG. 10 is a flowchart illustrating the computation of a layout. In step S1001, the preview mode is selected. Then, in step S1002, a record to be previewed is selected and inserted. In step S1003, the layout of the record is computed. A flowchart illustrating details of the layout computation is shown in FIG. 11 and described below. Then, in step S1004, the layout computed in step S1003 is displayed. It is then determined in step S1005 whether another record is to be previewed. If the outcome of step S1005 is NO, the process proceeds to step S1007 in which the preview mode is finished. If it is determined in step S1005 that another record is to be previewed, another record is selected in step S1006, and the layout is computed in step S1003 and is previewed in step S1004.

For printing records instead of displaying them, the layouts of all records to be printed are sequentially computed. Accordingly, step S1004 is not necessary. It is determined in step S1005 whether all records to be printed have been processed. The layouts computed in step S1003 are output, and print data is generated by using a printer driver and is output to a printer. When all of the designated records have been printed, this processing is completed. The above-described processing is executed under the control of the processor unit 135.

Figure 17A:
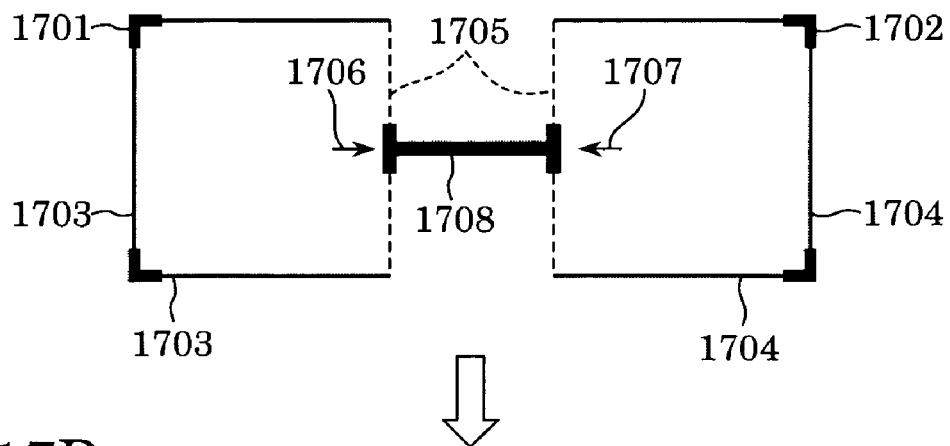
FIGS. 17A through 17C illustrate display examples of a user interface screen according to the flowchart of FIG. 11.
Figure 17B:
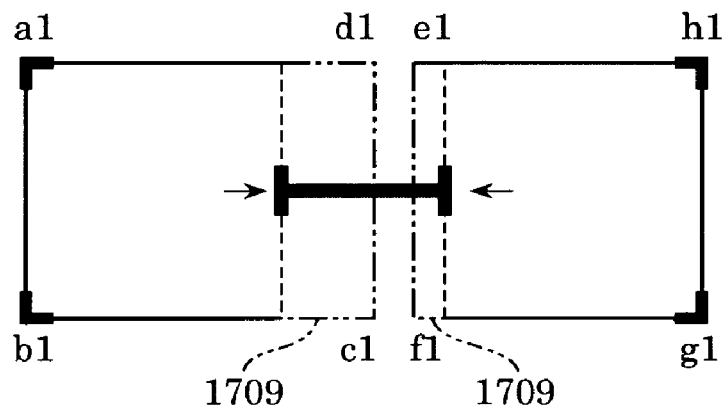
Figure 17C:
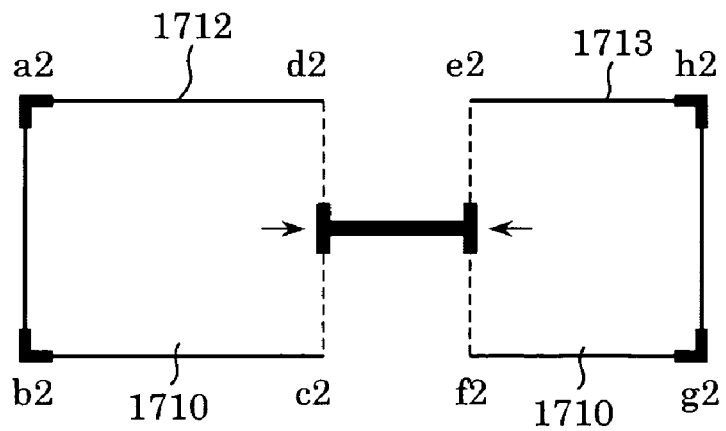

FIG. 11 is a flowchart illustrating details of the layout computation in step S1003. FIGS. 17A through 17C illustrate display examples of the user interface when the layout is computed. This flowchart illustrates a layout computation method for printing/previewing one record of variable data. For printing/previewing a plurality of records, the following processing is repeated.

Figure 15:
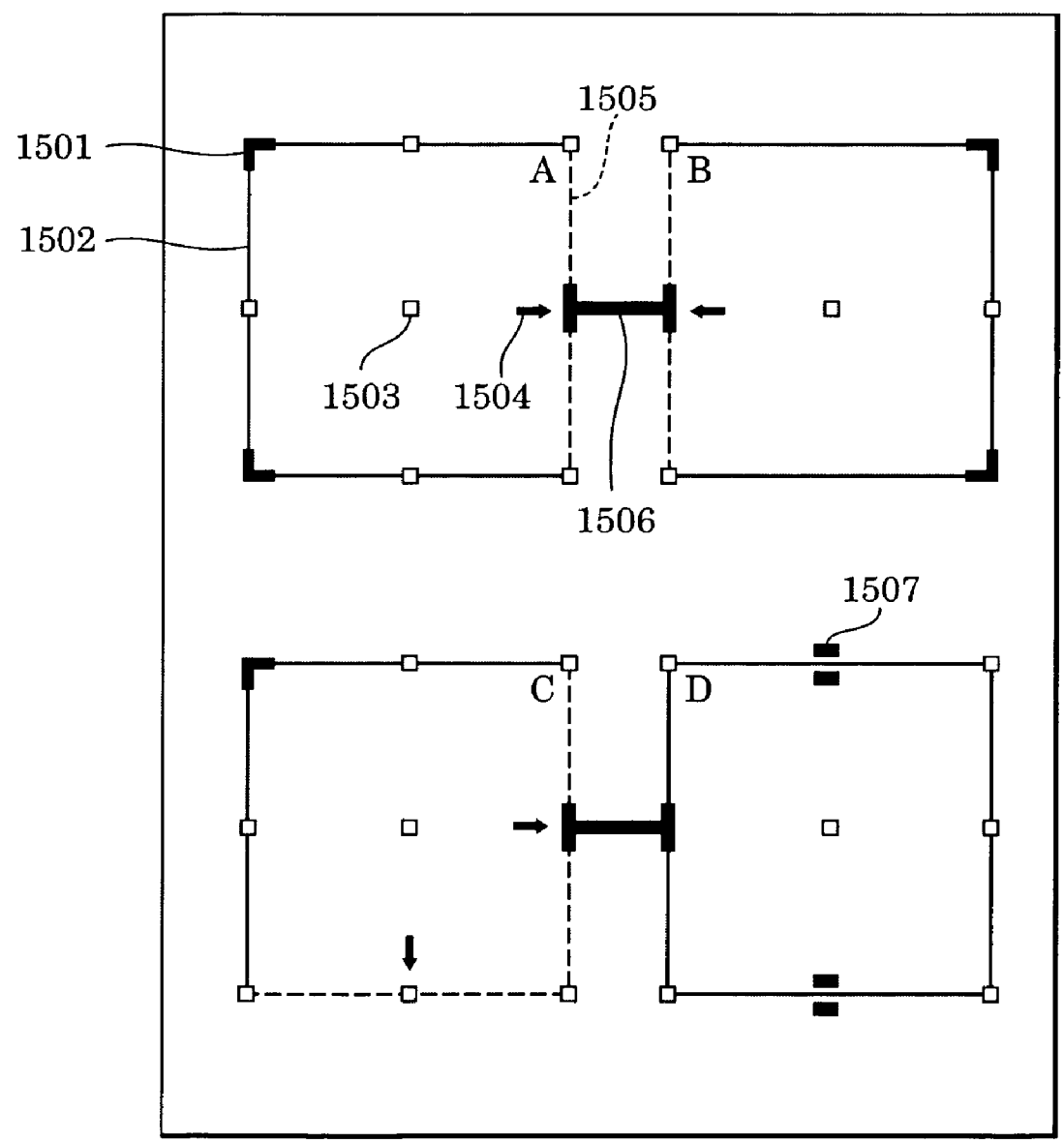
FIG. 15 illustrates sets of containers while a layout is being computed.

In step S1101, the layout editing application program 121 determines sets of containers for which the layout is calculated. The layout is calculated for a set of containers associated with each other. For example, in FIG. 15, the layout of four containers A, B, C, and D is formed on one page, and the associations for the containers A, B, C, and D are set by links, i.e., the containers A and B are determined to be set 1, while the containers C and D are determined to be set 2. In FIG. 15, there are shown anchors 1501, fixed sides 1502, control points 1503, arrows 1504 indicating the directions in which the containers can be changed, variable sides 1505, a link 1506, and sliders 1507.

Then, in step S1102, the layout editing application program 121 selects one set, for example, set 1 in FIG. 15, from the sets determined in step S1101 for computing the layout. The layout for the selected set of containers is then computed. First, the sizes of the two containers A and B, which are variable containers, contained in the selected set when no constraint is imposed on the containers A and B are calculated according to the size of image data or the amount of text data. More specifically, the layout editing application program 121 determines whether the container A is a container for image data or text data. This determination can be made by the attributes set in the container, as discussed above. The layout editing application program 121 then reads data to be inserted into the container A, and when the container A is for image data, the size (the number of pixels and the resolution of the width and the height) of the image data becomes the size of the container A. If the container A is for text data, the amount of text data to be inserted into the container A can be calculated from the number of characters of the text data and the character attributes, such as the font type, font size, character pitch, and line pitch, designated by the container attributes. If the container A is for text data, the aspect ratio of the container A cannot be determined without constraints. In the example shown in FIG. 15, since the anchors 1501 are provided at the top left and bottom left of the container A, the height (vertical direction) is fixed. Accordingly, the layout editing application program 121 determines whether the characters of the calculated data amount (text amount) can be accommodated in the width (horizontal direction) which is set as the basic pattern of the container A. If the width of the container A can accommodate all of the characters, there is no change in the size (width and height) of the container A set as the basic pattern.

If all of the characters cannot be accommodated in the width of the container A, the container A is extended in the horizontal direction since the height is fixed by the anchors 1501. The layout editing application program 121 computes how much the width of the container A should be extended to accommodate the calculated amount of data, thus determining the size of the container A.

In step S1103 in FIG. 11, the layout editing application program 121 optimizes the layout to minimize the difference with the actual size of the content. In the containers associated with each other so that they can be dynamically changed, the layout is optimized so that the size of content to be inserted into each container and the size of the container to be determined can be as close as possible. The layout editing application program 121 determines the size of the set of containers calculated in step S1102, i.e., the total size of the container A, container B, and the link 1506 (fixed link), and calculates the difference between this total size and the size of the containers in the basic layout (in the example shown in FIG. 15, the distance between the anchor icons provided for the container A and container B). If it is calculated in step S1102 that the width of the container A or container B is increased, the above-described difference is generated. The layout editing application program 121 then equally allocates this difference to the elements of the set of containers so as to adjust the layout.

After optimizing the layout in step S1103, the layout editing application program 121 determines in step S1104 whether the layout satisfies the rules (constraints imposed on the containers). If the layout does not satisfy the rules, the process returns to step S1103 in which the layout is re-optimized. The rules are constraints imposed on containers, such as the size and the position of a container, and the length of a variable link, set by the user when the layout is determined. If the layout satisfies the rules, the layout for the set of containers selected in step S1102 is completed. It is then determined in step S1105 whether the layouts of all sets of containers on one page have been calculated. If it is determined in step S1105 that the layouts of all sets of containers on one page have not been calculated, processing returns to step S1102. If it is determined in step S110S that the layouts of all sets of containers on one page have been calculated, the layout calculation processing is completed.

FIGS. 17A through 17C illustrate display examples of the user interface screen when the layout is computed. In FIG. 17A, the layout is determined by inserting a certain record. In FIG. 17A, there are shown anchors 1701 and 1702, fixed sides 1703 and 1704, variable sides 1705, arrows 1706 and 1707 indicating the directions in which the variable sides 1705 can be changed, and a link 1708. In this state, the record is changed and content having a different size is inserted, and the layout is changed to the state shown in FIG. 17B. The variable sides 1705 are shifted from the state shown in FIG. 17A to the state shown in FIG. 17B, as indicated by the two-dot-chain lines. Then, the layout is adjusted by taking the rules into consideration, as shown in FIG. 17C. The difference between the sizes of containers 1712 and 1713 is calculated to be similar to the difference between the actual sizes of content to be inserted while satisfying the above-described rules. As shown in FIG. 17C, the container sizes are calculated so that the difference between the content sizes ($a1b1c1d1$, $e1f1g1h1$) to be inserted, as shown in FIG. 17B, is similar to the difference between the content sizes ($a2b2c2d2$, $e2f2g2h2$) after being calculated. The above-described processing is executed under the control of the processor unit 135.

Figure 7:
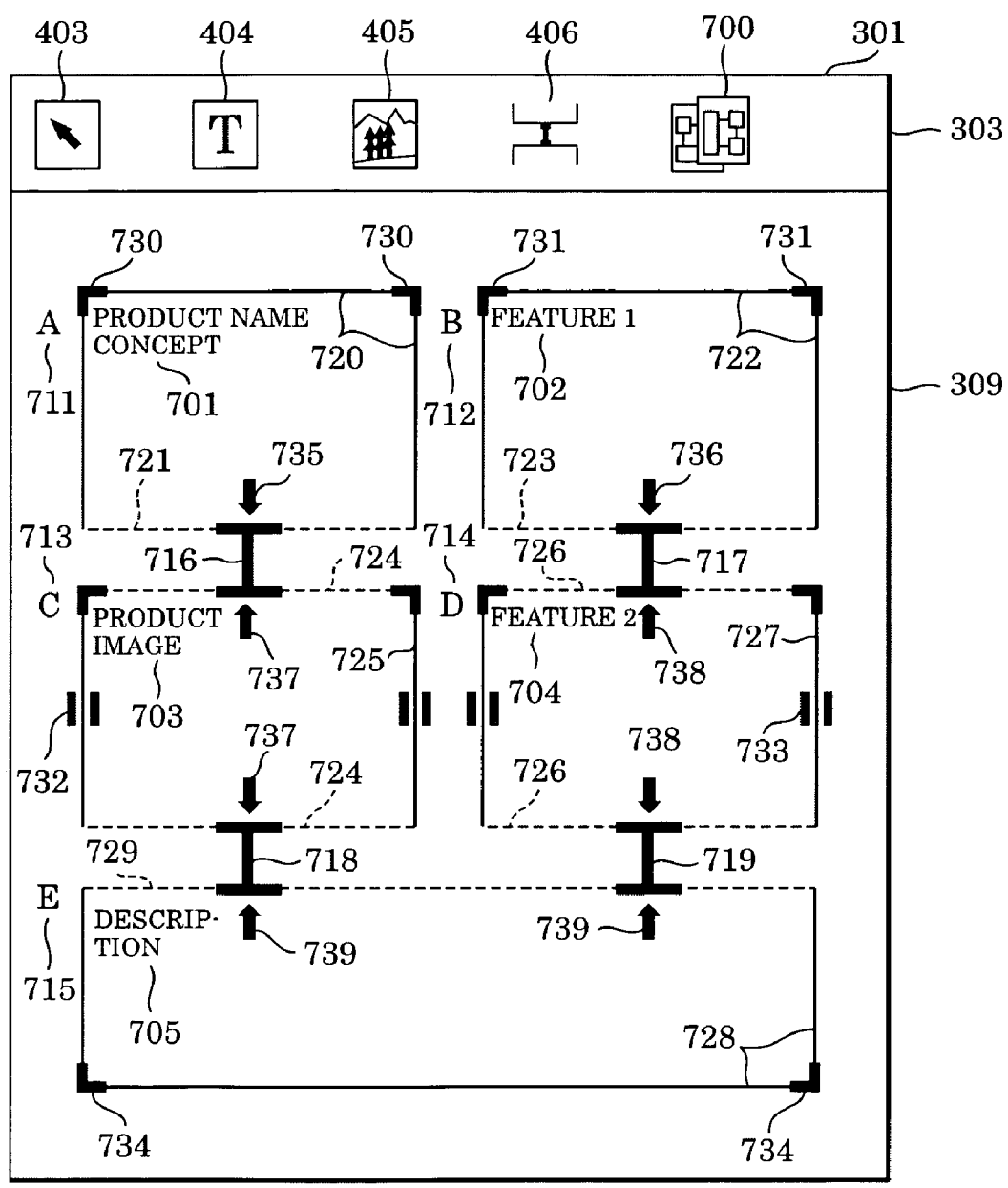
FIG. 7 illustrates a general layout of containers.

FIG. 7 illustrates a general layout formed by using containers. The application window 301 includes the tool bar 303, and a container A 711, a container B 712, a container C 713, a container D 714, and a container E 715 are disposed on the document template 309. In each container, fixed sides are indicated by solid lines, while variable sides are indicated by broken lines. The container A 711 is defined by anchor icons 730, fixed sides 720, and a variable side 721. The container B 712 is defined by anchor icons 731, fixed sides 722, and a variable side 723. The container C 713 is defined by fixed sides 725 and variable sides 724. The container D 714 is defined by fixed sides 727 and variable sides 726. The container E 715 is defined by anchor icons 734, fixed sides 728, and a variable side 729.

The anchors are disposed at the corners of the corresponding containers, and indicate that the sides corresponding to those corners are not moved from those positions. Since the containers A through E have variable sides, indicators 735 through 739 indicating the directions in which the variable sides can be moved are provided for the containers A through E, respectively. The indicators indicate that the corresponding variable sides of the containers can be moved in the directions indicated by the arrows pointed by the indicators and in the opposite directions.

Sliders 732 and 733 indicate that the sizes of the containers C and D can be increased or decreased vertically. The sliders are provided for fixed sides, in this case, for example, the sliders 733 are indicated for the fixed sides 727. This means that the container D 714 can be extended or shrunk vertically since the variable sides 726 can be moved vertically although the fixed sides 727 cannot be moved horizontally. In the container A, "product name concept" is indicated, in the container B, "feature 1" is indicated, in the container C, "product image" is indicated, in the container D, "feature 2" is indicated, and in the container E, "description" is indicated. These indications are related to database field names (column names) in a database. In the example shown in FIG. 7, product name and concept text is inserted into the container A, features of product inserted into container A text is inserted into the container B and container D, image of product inserted into container A text is inserted into the container C, and description of product inserted into container A text is inserted into the container E.

As discussed with reference to FIG. 4, the tool bar 303 includes the selection tool button 403, the text container tool button 404, the image container tool button 405, and the link tool button 406. In FIG. 7, a layout check button 700 is further provided, and the layout check button 700 can be pressed to start layout checking. Layout checking displays a print preview on the user interface screen of the layout editing application program 121 by reading and inserting related variable data into the containers on the template document of the basic layout formed by the layout editing application program 121.

Figure 14:
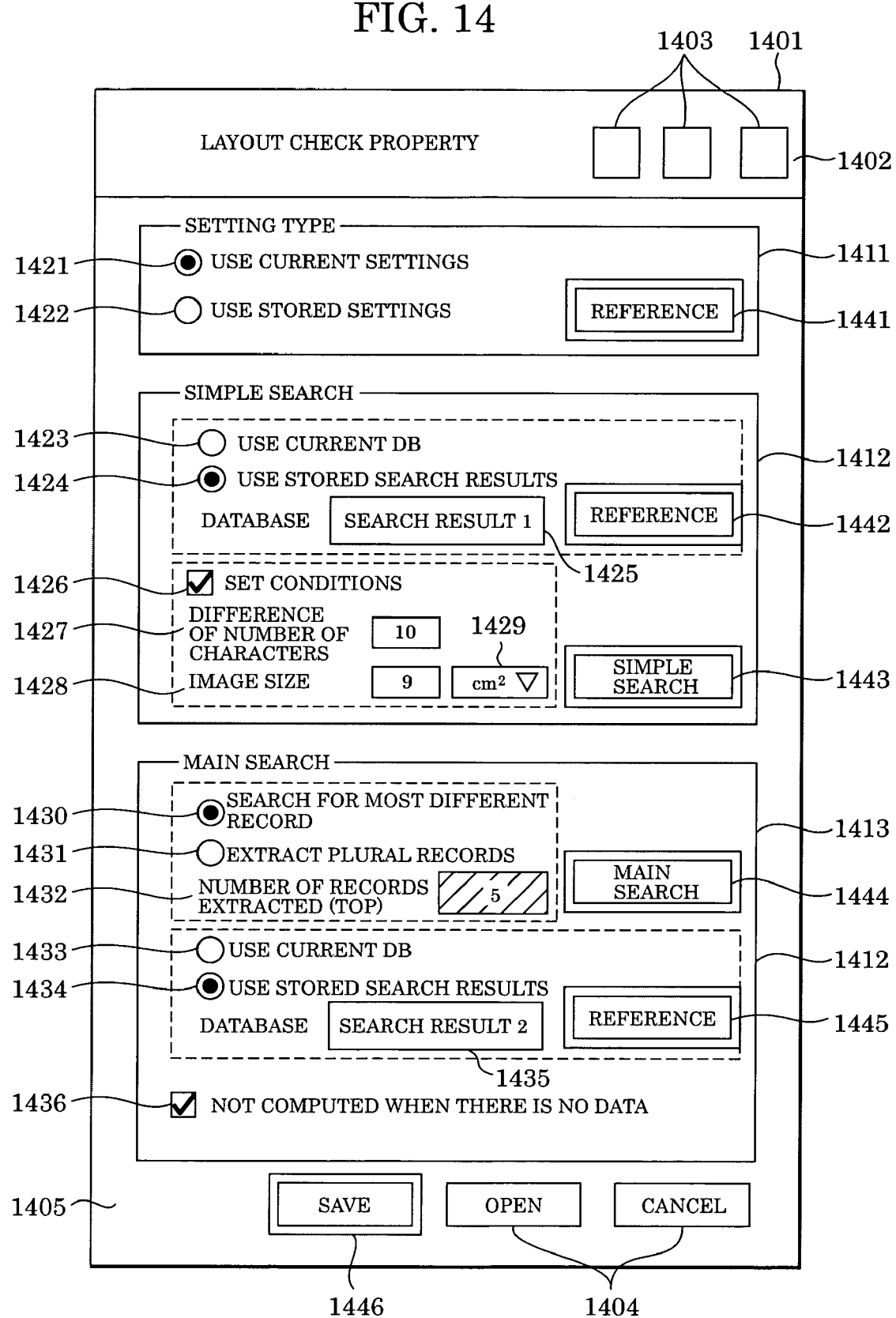
FIG. 14 illustrates a property dialog window.

FIG. 14 illustrates a property dialog window 1401 displayed as a result of pressing the layout check button 700 or selecting a general menu command with the keyboard 132 or the mouse 133. In this embodiment, items for setting various conditions when layout checking is conducted are indicated in the property dialog window 1401. The property dialog window 1401 includes a title bar 1402, tool buttons 1403, buttons 1404 for opening and closing the property dialog window 1401, and an area 1405 for setting various items of information. The area 1405 includes a block 1411 for selecting a condition for conducting layout checking, a block 1412 for setting conditions for conducting simple search (also referred to as "primary search") for refining the number of records in a database, and a block 1413 for setting conditions for conducting main search (also referred to as "main search") for extracting records which are very different from a basic layout after computing actual layouts. The simple search is preliminary search performed before the main search.

In the block 1411, a button 1421 for using current settings or a button 1422 for reading previous conditions can be selected as the condition for conducting layout checking. As a default, the button 1421 for using current settings is checked, and data is indicated in the blocks 1412 and 1413 according to the conditions stored in the registry or the memory unit 136. When the button 1422 for using previous conditions is selected, a reference button 1441 disposed at the right side can be pressed. When the reference button 1441 is pressed, previous search condition settings stored in the HDD 140 are read into the memory unit 136 so that the corresponding data is indicated in the blocks 1412 and 1413. In this example, the button 1421 for using current settings is checked.

In the block 1412, simple search conditions are set, and the type of database used for simple search is selected. Simple search is used for extracting records which are very different from a basic layout after comparing data in the database. Thus, main search for extracting records by comparing all layouts with a basic layout is much more precise. However, if the application is connected to a database having a very large amount of data (many records), extracting records after checking all layouts is very time-consuming. It is much more efficient if the number of records is decreased to a certain degree before conducting a main search by filtering records having a similar amount of data based on the data amount of the database. Accordingly, it is more effective in conducting simple search to decrease the number of records in the database before conducting a main search.

If the layout editing application program 121 conducts a simple search by using a currently connected database, a button 1423 for using the current DB is selected. If a search was conducted before and if stored search results are used for conducting a simple search with a new condition, a button 1424 for using stored search results is selected. In this case, it is necessary to use a search result database, and a reference button 1442 is pressed to select the database from a search result list stored in the HDD 140.

Figure 18:
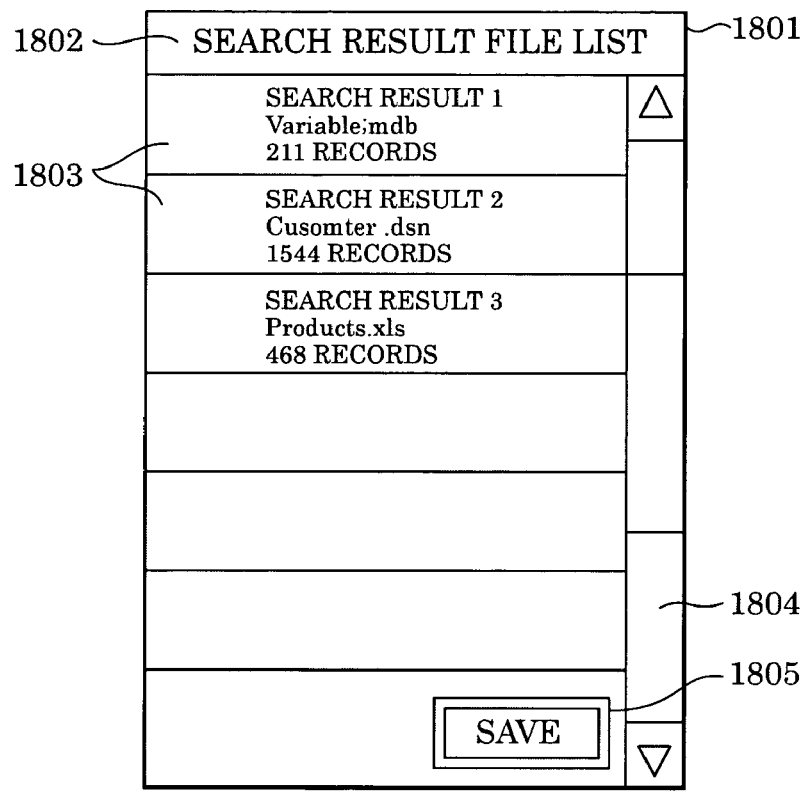
FIG. 18 illustrates an example of a dialog window displaying a search result file list.

FIG. 18 illustrates an example of a dialog window 1801 indicating a search result file list. The dialog window 1801 includes a title 1802, a scroll bar 1804, and a list 1803 indicating file information of search results. In the list 1803, the file name, the searched database name, and the number of extracted records are indicated. The file selected in this list 1803 is indicated in a new window when pressing a database search result button 1425 shown in FIG. 14.

Referring again to FIG. 14, conditions for conducting a simple search can be set by a check box 1426. As the conditions, a box 427 for setting the difference of the number of characters, a box 1428 for setting the image size, and a list box 1429 for specifying the unit for the image size are provided. Details of computation flows and algorithms for extracting records by the difference of the number of characters and the image size are described below with reference to FIGS. 20A through 20D. To start a simple search, a simple search button 1443 is pressed. The search result is added to the search result file list shown in FIG. 18, and the resulting list is displayed. If the user wishes to save the result, he/she can press a save button 1805. If the user wishes to obtain detailed information concerning the search result, he/she can select a desired file from the list and right-click the file with the mouse so as to display a record list dialog window 1901 shown in FIG. 19.

The dialog window 1901 includes a title 1902, a scroll bar 1903, a file name box 1904 indicating the search result file name, and a searched record list 1905. When selecting a record from the list 1905, the layout of the selected record is computed so that the layout result is previewed on the user interface screen, such as the right window of FIG. 8, which is described in detail below.

Referring back to FIG. 14, the settings of a main search (secondary search) are described below. The settings of a main search can be conducted in the block 1413. The number of records to be extracted in this main search is first specified. If the record having the largest difference from the record specified by the user is extracted, i.e., if the number of records to be extracted is only one, a button 1430 for searching for the most different record is selected. However, it is difficult to predict whether the most different record matches the layout that the user wishes to obtain. If the extracted record does not match the layout that the user wishes, the user has to conduct a search again.

Since layout computation is executed in the main search, it may take more time than the user has intended. One approach to avoiding this situation is to extract a plurality of records that can be considered to be most different. Accordingly, even if the layout of one record does not match the layout that the user has intended, the user can immediately check the layouts of the other records, thus significantly reducing the time for conducting layout checking. Thus, if the user wishes to extract a plurality of records that are considerably different from the designated record, he/she selects a button 1431 for extracting a plurality of records.

The number of extracted records (top) can be specified in a box 1432, which is shadowed in the example shown in FIG. 14 since the number is not selected. As in the simple search block 1412, the database to be searched can be specified in the main search block 1413. When selecting a button 1433 for using the current DB, the layouts of all records in the database currently connected to the application are computed to extract the record having the largest difference. As stated above, however, if the number of records in the database is very large, it may take time to search for the record having the largest difference by computing the layouts of all records and by calculating the differences of all the records according to the conditions. Accordingly, a main search can be performed using only the records extracted by the simple search. In this case, a button 1434 for using stored search results is selected, and by pressing a reference button 1445, a file to be searched can be specified from a search result file list, such as that shown in FIG. 18. Then, the selected database file name is displayed in a box 1435.

A check box 1436 is provided for determining whether the layout of a container is computed even when there is no data inserted into that container and whether the computation result is added as the difference. When the check box 1436 is checked, the layout is not computed when there is no data to be inserted into the container. That is, for this container, the value 0 is added as the difference. Conversely, when the check box 1436 is checked, the layout is computed even if there is no data. Specific layout computation flows and algorithms are discussed below in detail with reference to FIGS. 22A through 22E.

Figure 8:
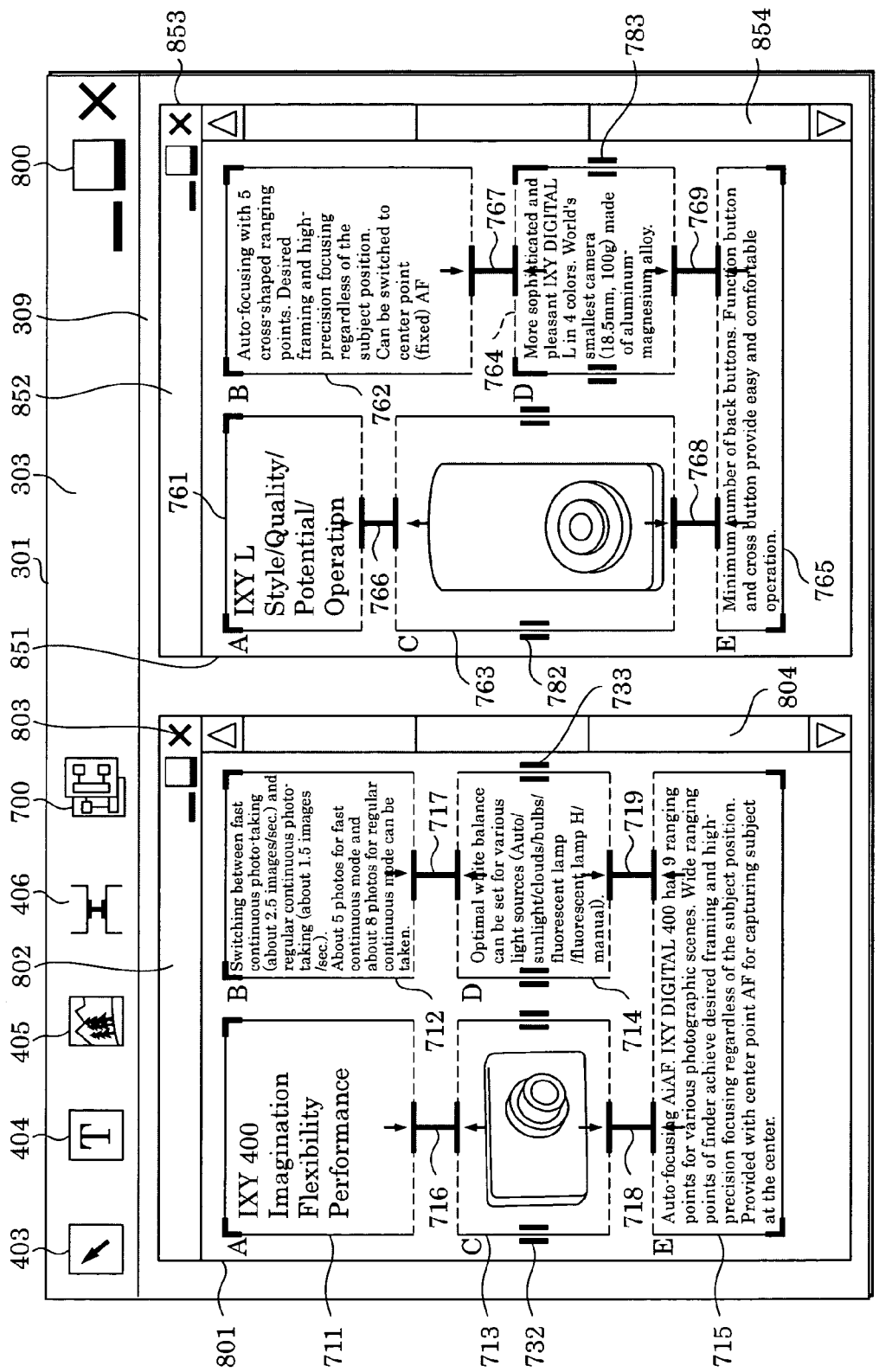
FIG. 8 illustrates an example of a layout when data of a specified record and data of an extracted record are inserted into the layout shown in FIG. 7.
Figure 19:
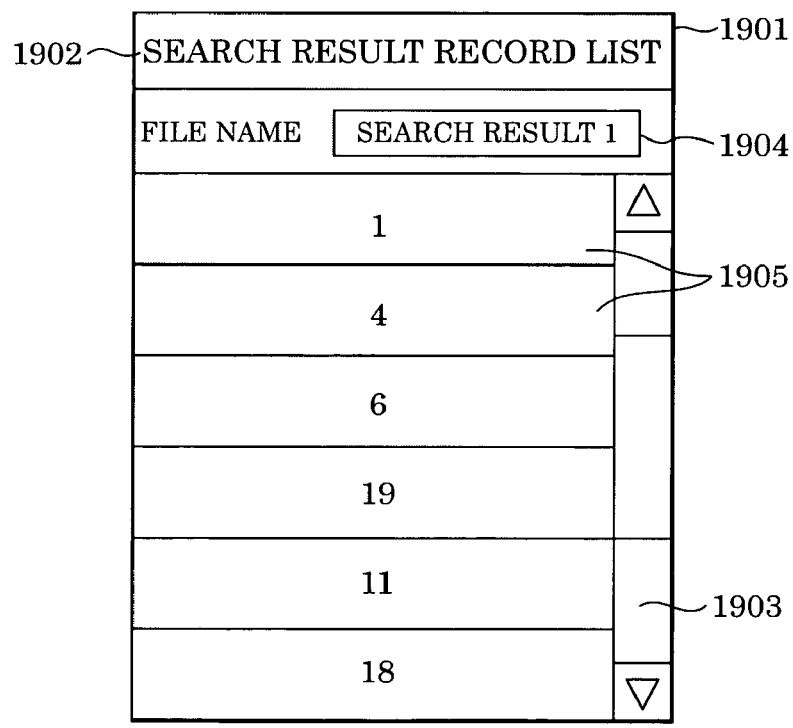
FIG. 19 illustrates a dialog window concerning search results.

To start the main search, a main search button 1444 is pressed. As in the simple search, the main search result is added to a search result file list, such as that shown in FIG. 18. When a file is selected from this list, a record list, such as that shown in FIG. 19, is provided, and by selecting a record, details of the selected record can be previewed in the UI, as shown in FIG. 8. A save button 1446 is provided for storing the conditions set in the layout check property 1405 in, for example, the HDD 140. The setting files stored can be referred to by pressing the reference button 1441, and can be re-read by pressing the button 1422.

Figure 9:
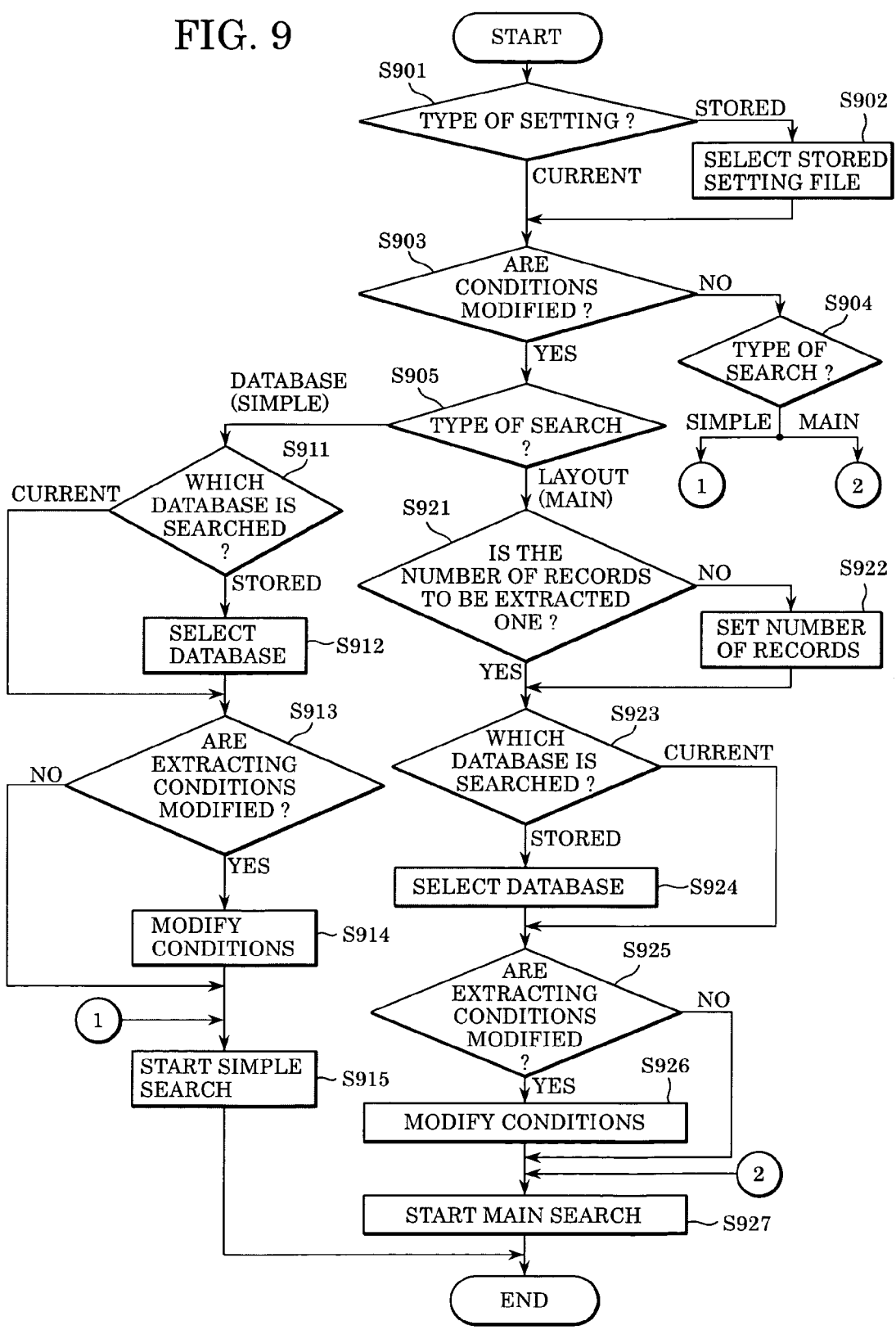
FIG. 9 is a flowchart illustrating processing for setting conditions set by a user in a property dialog shown in FIG. 14.

FIG. 9 is a flowchart illustrating processing for setting conditions in the property dialog shown in FIG. 14. In step S901, the layout editing application program 121 selects the type of operation for setting search conditions based on the input of an instruction from the user. More specifically, the layout editing application program 121 selects whether the current settings or previous settings are used. If it is determined in step S901 that the current settings are used, the layout editing application program 121 proceeds to step S903 to determine whether the file conditions are to be modified. If the previous settings are used, the process proceeds to step S902 in which the layout editing application program 121 reads the stored search file. Then, in step S903, the layout editing application program 121 determines whether the file conditions are to be modified. If the file conditions are not modified, it is determined in step S904 whether simple search or main search is conducted. According to the outcome of step S904, simple search or main search is started in step S915 or S927, respectively.

If it is determined in step S903 that the file conditions are modified, the layout editing application program 121 determines in step S905 whether simple search for filtering the database or main search for computing layouts is conducted. If simple search is conducted, the layout editing application program 121 proceeds to step S911 to determine whether search is conducted by using the current database or the previous result. If the stored result is used, the layout editing application program 121 reads the search result file in step S912. Then, the layout editing application program 121 determines in step S913 whether to modify the conditions for extracting data. If the result of step S913 is YES, the conditions are modified in step S914. Then, in step S915, simple search is conducted.

If it is determined in step S905 that main search is conducted, the layout editing application program 121 determines in step S921 whether the number of records to be extracted is only one. If the outcome of step S921 is YES, the process proceeds to step S923. If a plurality of records are to be extracted, the layout editing application program 121 sets the number of records to be extracted in step S922. Then, the process proceeds to step S923.

In step S923, the layout editing application program 121 determines whether search is conducted by using the current database or the stored result. If the stored result is used, the process proceeds to step S924 in which the layout editing application program 121 reads the search result file. Then, in step S925, the layout editing application program 121 determines whether conditions for extracting data are modified. If the outcome of step S925 is YES, the conditions are modified in step S926. Then, in step S927, main search is started.

Figure 12:
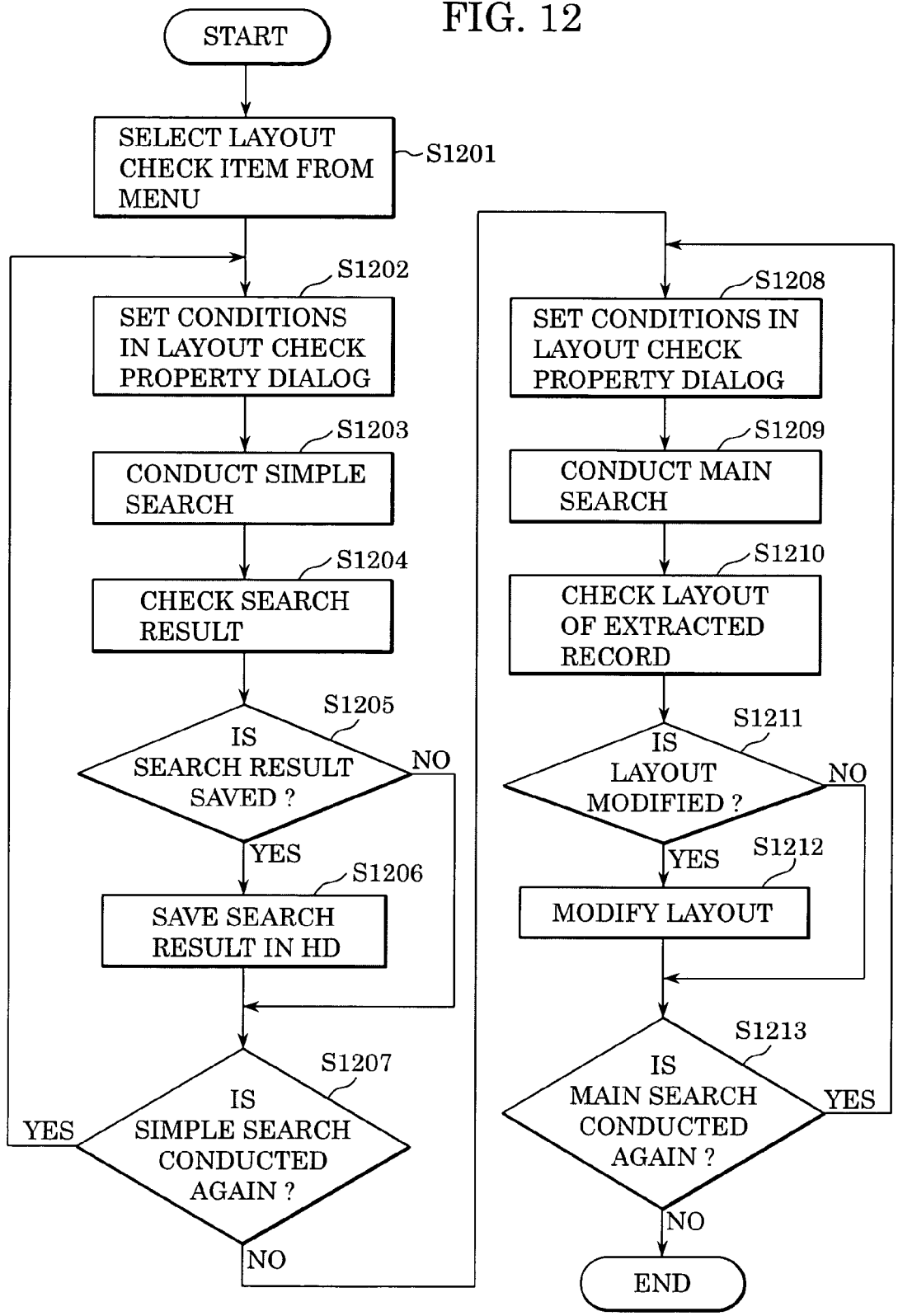
FIG. 12 is a flowchart illustrating a layout checking operation performed by a user.

FIG. 12 is a flowchart illustrating a layout checking operation performed by the user. In step S1201, a layout check item is selected from a menu or a tool bar. Then, in step S1202, conditions for simple search are set in the layout check property dialog. As stated above, the database may contain a large amount of data, and thus, the layout editing application program 121 first conducts a simple search to filter records which are similar to a specified record in step S1203.

Then, in step S1204, the layout editing application program 121 checks the search result, and determines in step S1205 whether the search result matches the layout that the user has intended. If the outcome of step S1205 is YES, the layout editing application program 121 stores the result in, for example, the HDD 140 in step S1206. Regardless of the outcome of step S1205, the layout editing application program 121 determines in step S1207 whether a simple search is conducted again. If it is determined that a simple search is to be conducted again, the process returns to step S1202, and step S1202 and the subsequent steps are repeated. The database can be filtered until the user obtains a desired result. In this case, the stored result may be used for filtering the database, and this filtering result can reflect the subsequent simple search.

After finishing the simple search(es), i.e., if the result of step S1207 is NO, the layout editing application program 121 proceeds to step S1208 to set conditions for a main search. Then, the layout editing application program 121 starts a main search in step S1209 by using the database that was filtered by the simple search in step S1206. In step S1210, the layout editing application program 121 checks the layout of the extracted record by a preview of the UI screen. Then, in step S1211, as a result of checking, the layout editing application program 121 determines whether the layout is modified in response to an instruction from the user. If the outcome of step S1211 is YES, the layout is modified on the preview UI screen in step S1212. If the layout is modified, the layout of the specified record is also to be changed. Accordingly, the layout editing application program 121 displays both layouts of the specified record and the extracted layout on the preview UI screen to present the result of changing the layout of the extracted record or the designated record. This enables the user to understand how much a change in the layout of one record influences the layout of the other record. An example of this operation is shown in FIG. 8, which is described in detail below. If the layout is modified, the record having the largest difference may be changed. To search for such a record, the layout editing application program 121 determines in step S1213 whether a main search is conducted again. If a main search is conducted again, the process returns to step S1208 to conduct main search. By repeating the main search, the optimal layout can be determined.

Figure 13:
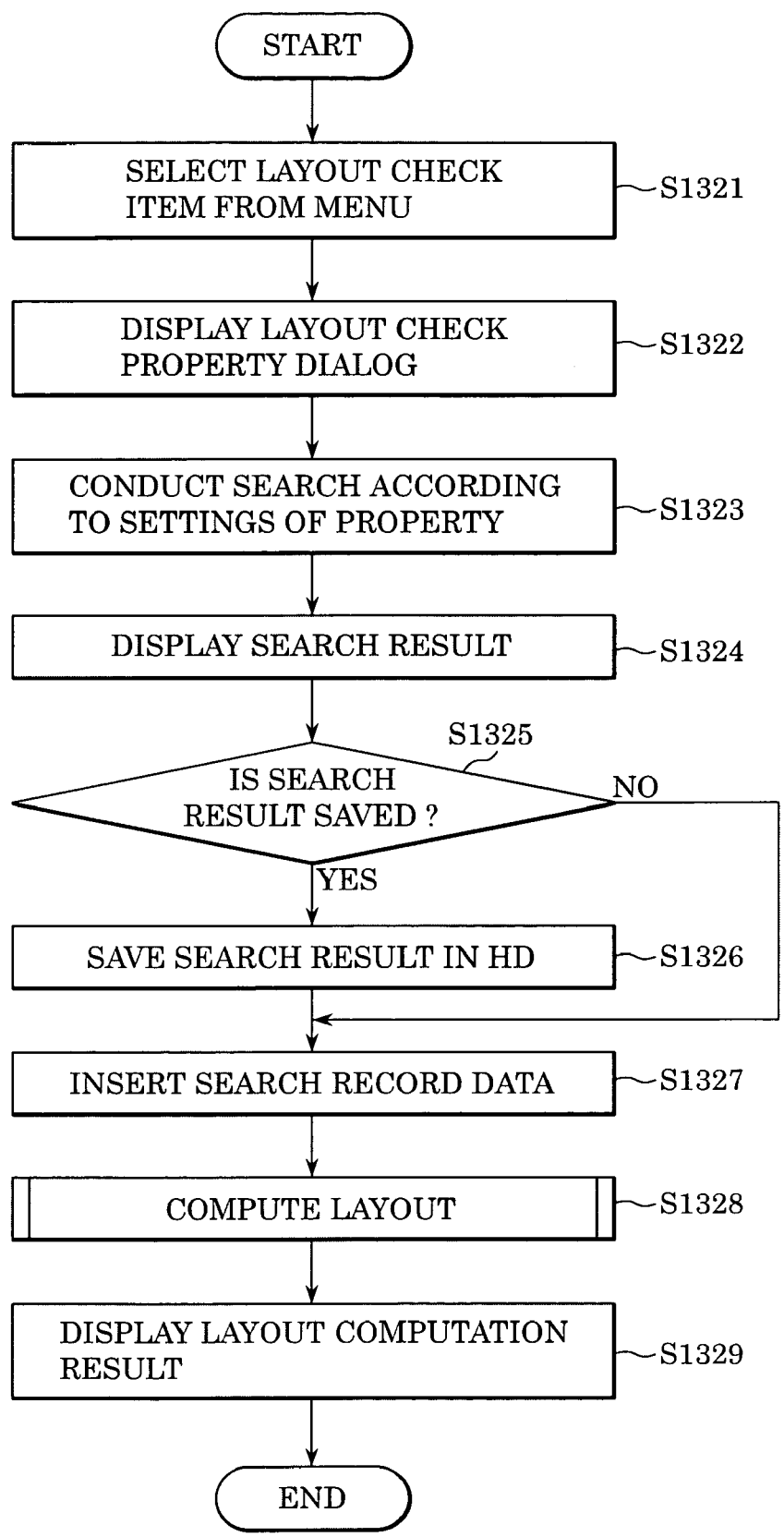
FIG. 13 is a flowchart schematically illustrating settings for search conditions, the execution of search, the storage of search results, and the preview display according to the search results.

FIG. 13 is a flowchart schematically illustrating settings for search conditions, the execution of a search, the storage of search results, and the preview display according to the search results. In step S1321, the layout editing application program 121 selects a layout check item from a menu. Then, in step S1322, the layout check property dialog is displayed. The layout editing application program 121 then conducts a search according to the settings of the property in step S1323 and displays a search result in step S1324. The layout editing application program 121 then determines in step S1325 whether to store the search result. If the outcome of step S1325 is YES, the search result is stored in, for example, the HDD 140 in step S1326. Then, in step S1327, the layout editing application program 121 fetches data of extracted records from the database and inserts the data into the layout of the specified record. The layout editing application program 121 then computes the layout in step S1328, and displays a preview of the computation result in step S1329.

FIG. 8 illustrates an example of data of a specified record and an extracted record inserted into the layout shown in FIG. 7. In the application window 301, a layout view window 801 and a layout view window 851 are displayed. The layout view windows 801 and 851 include title bars 802 and 852, tool buttons 803 and 853 for maximizing, minimizing, and closing the windows, scroll bars 804 and 854, respectively. The layout view window 801 shows the data of the layout of a specified record inserted into the layout shown in FIG. 7, which is used for searching for the record having the largest difference from this specified record. The layout view window 851 shows the record extracted as a result of layout checking and inserted into the layout shown in FIG. 7.

The specified record is a record used for forming the layout or a record having a layout desired by the user. Containers in such a layout are referred to as the containers at the regular position. Text is inserted into each of the containers A, B, D, and E, while an image is inserted into the container C. It is now assumed that the layout in the layout view window 801 is well balanced as in the layout shown in FIG. 7 and matches the layout that the user has intended. While previewing this layout, layout checking is started by pressing a layout check button or a menu command. The layout of the extracted record is displayed in the layout view window 851. The layout view window 851 shows that the layout is not well balanced; for example, the image size in the container C is increased, the character size in the container A is somewhat decreased, and the height of the container E is slightly smaller. Thus, by using the layout check function, layouts on the UI screen can be compared, and if the layout is modified in one layout view window, the influence of a change in that layout on the layout in the other layout view window can be reflected. This processing is executed under the control of the processor unit 135 and the layout editing application program 121.

Figure 20A:
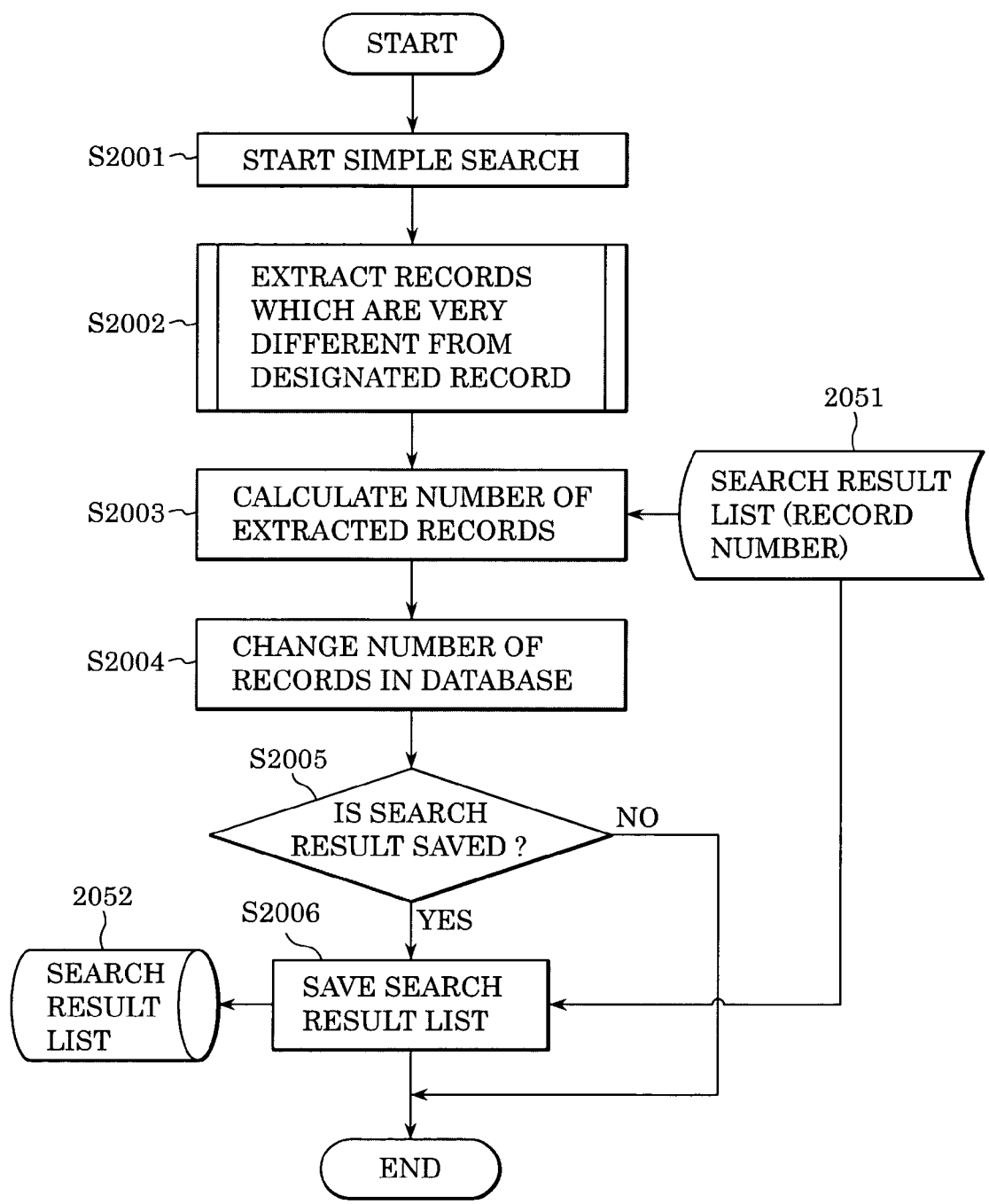
FIG. 20A is a flowchart illustrating the overall processing for simple search.
Figure 20B:
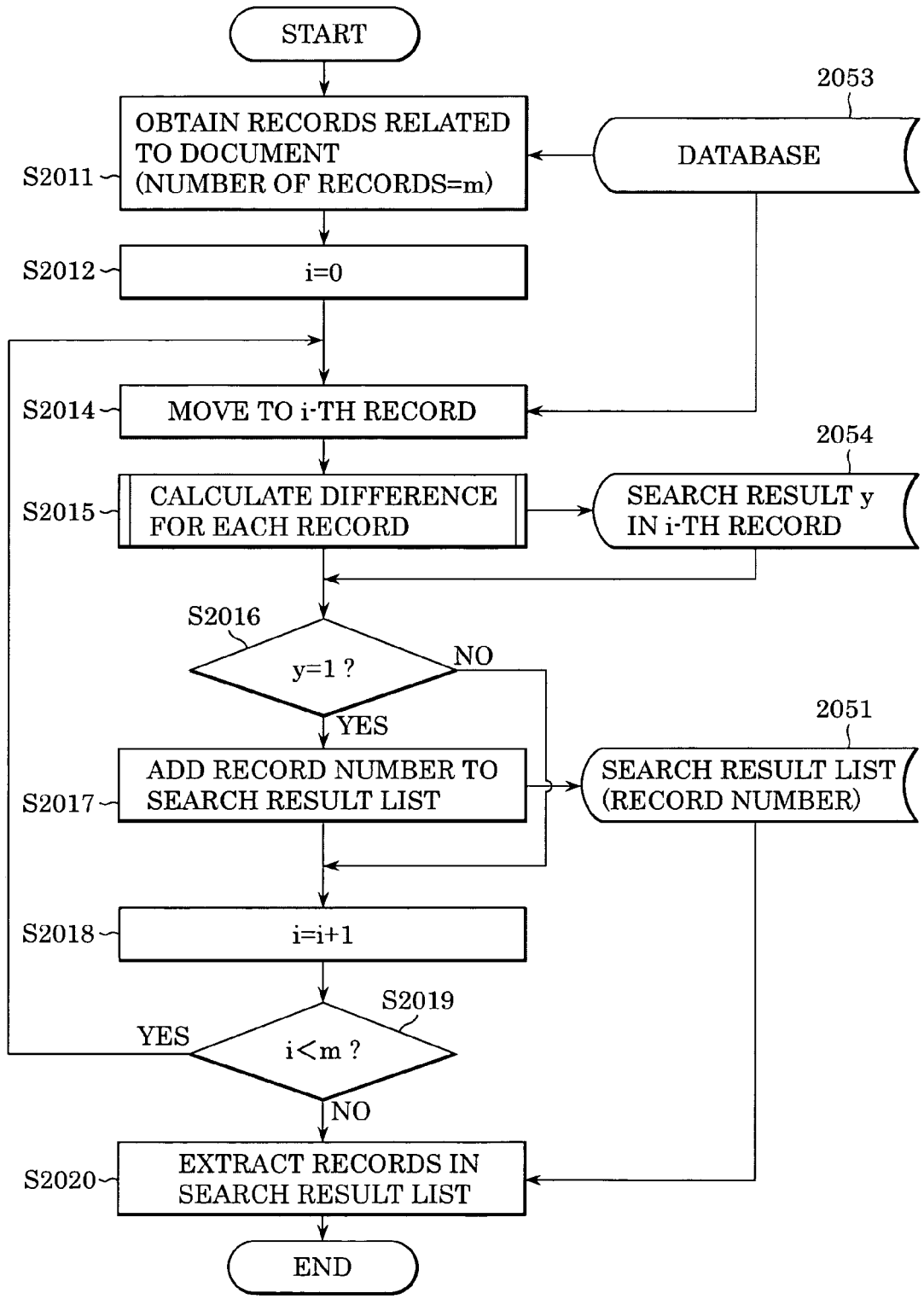
FIG. 20B is a flowchart illustrating details of step S2002 in FIG. 20A.

Simple search processing is specifically discussed below with reference to the flowcharts of FIGS. 20A through 20D. FIG. 20A is a flowchart illustrating the overall simple search processing. When simple search is started in step S2001, the layout editing application program 121 extracts records which are very different from the specified record from the database in step S2002. FIG. 20B, described below, illustrates processing for extracting records that are very different from the specified record in the database. The number of extracted records is calculated from a search result list 2051 in step S2003, and the number of records in the search result list is updated in step S2004. The layout editing application program 121 then determines in step S2005 whether the search result list is to be saved. If the outcome of step S2005 is YES, the search result list 2052 is stored in, for example, the HDD 140 in step S2006.

FIG. 20B is a flowchart illustrating details of step S2002 in FIG. 20A for extracting records which are very different from the specified record. In step S2011, the number m of records related to the document is obtained from a database 2053 designated by the user. In step S2012, the layout editing application program 121 sets the counter i to be 0, and steps S2014 through S2018 are repeated by the number m of records.

In the loop of step S2014 through step S2019, the layout editing application program 121 first moves to the i-th record indicated by the counter in step S2014. The layout editing application program 121 calculates the layout difference for each record (i-th record) in step S2015, and then checks in step S2016 from a search result y 2054 whether the result in step S2015 matches the condition (y=1). Details of processing of step S2015 of calculating the layout difference of each record are illustrated in the flowchart of FIG. 20C described below. If it is determined in step S2016 that the result of step S2015 matches the condition (y=1), the record number is added to the search result list 2051 in step S2017. Then, in step S2018, the counter i is incremented by one to move to the subsequent record. After repeating steps S2014 through S2018, the layout editing application program 121 exits from the loop when it is found in step S2019 that there is no record to be searched. Then, in step S2020, the records stored in the search results list 2051 are extracted.

FIG. 20C is a flowchart illustrating details of step S2015 in FIG. 20B for calculating the difference for each record. In step S2015, it is checked whether the search record indicated by the current counter i matches the search condition. In step S2021, the layout editing application program 121 obtains the number n of document containers from a container list 2055 stored in the file or the registry. In step S2022, the counter j and the check variable x are set, and steps S2024 through S2028 are repeated for the number n of containers.

If it is found in step S2026 that the check variable x is not 0, the layout editing application program 121 exits from the loop in step S2029 even if there are containers to be calculated. With this arrangement, if even one container matches the search condition after calculating the difference in step S2025, the corresponding record can be prevented from being filtered. This makes it possible to prevent a record which may disturb the layout in the subsequent step of main search from being filtered in the simple search, thus achieving higher-precision layout checking. Accordingly, only when none of the containers matches the search condition, can the record be filtered.

In the loop of step S2024 through S2029, in step S2024, the layout editing application program 121 first moves to the j-th container indicated by the counter. Then, in step S2025, the layout editing application program 121 calculates the layout difference for each container (j-th container) of the current record i. FIG. 20D is a flowchart illustrating details of step S2025 and is described below. Then, it is checked in step S2026 whether the container matches the condition (x=1). If the outcome of step S2026 is YES, the process proceeds to step S2027 in which the search result y 2054 in the i-th record is stored. Then, the layout editing application program 121 exits from the loop in step S2029.

If it is determined in step S2026 that the condition is not satisfied, the process proceeds to step S2028 in which the counter i is incremented by one to move to the subsequent container. After repeating steps S2024 through S2028, when it is found in step S2029 that there is no container to be searched or the condition (x=1) is satisfied, the layout editing application program 121 exits from the loop.

FIG. 20D is a flowchart illustrating details of step S2025 in FIG. 20C for calculating the difference for each container. In step S2025, the difference is calculated based on the specified record, the j-th container, and data inserted into the j-th container, and it is checked whether the j-th container indicated by the current counter matches the condition (x=1).

In step S2031, the layout editing application program 121 checks from the database 2053 whether there is data to be inserted into the container. If there is no data to be inserted into the container, the process proceeds to step S2036 in which x is set to be 1, and the processing is completed. If there is data to be inserted into the container, the layout editing application program 121 determines in step S2032 whether the data is text or image data. If the data is text, the process proceeds to step S2033 in which the layout editing application program 121 calculates the absolute value of the difference between the number of characters inserted into the j-th container of the i-th record and the number of characters inserted into the j-th container of the specified record.

FIG. 26 illustrates an example of the configuration of the database 2053. A database table 2601 includes a database name 2602, a definition 2603 of database field names, and a record number 2604. As the database fields, a product concept 2611, a product image 2612, a feature 2613, a feature 2614, and a description 2615 are defined. FIG. 27 illustrates an example of the container list 2055 shown in FIG. 20C. A container list 2701 includes a list title 2702, a container number 2703, and a container name 2704 corresponding to the container number. For example, in step S2033 of FIG. 20D, if i is 3 and j is 4, the number of characters inserted into container number 4 (container E) of record number 3 in the database 2601 in FIG. 26 can be calculated to be 77.

Since the specified record is record number 0, the number of characters inserted into the corresponding container (container E) of record number 0 can be calculated to be 156. The difference between 156 and 77 is 79. Then, in step S2035, the layout editing application program 121 determines whether the obtained value (79) satisfies a condition 2056 set in the property dialog window 1401. Although this determination is made based on the condition set in the property dialog window 1401, determination results may be stored in the application, and the application can automatically make a determination from the results as a learned value 2057 over time without the need for an instruction from the user. The property dialog window 1401 shows that a container having a difference of number of characters of 10 or more (FIG. 14) satisfies the condition. Accordingly, the obtained value is found to satisfy the condition in step S2035. Then, 1 is set in the check variable x in step S2036. Accordingly, the outcome of step S2026 of FIG. 20C becomes YES, and the search result y 2054 in the i-th record is stored in the search result list 2051 in step S2027. As in text, if the data is found to be image data in step S2032 of FIG. 20D, the process proceeds to step S2034 in which the layout editing application program 121 calculates the absolute value of the difference between the image size inserted into the j-th container of the i-th record and the image size inserted into the j-th container of the specified record. It is then determined in step S2035 whether the obtained value satisfies the condition. The subsequent processing is performed similarly to that described above for the text data. The above-described processing is executed under the control of the processor unit 135.

Figure 22B:
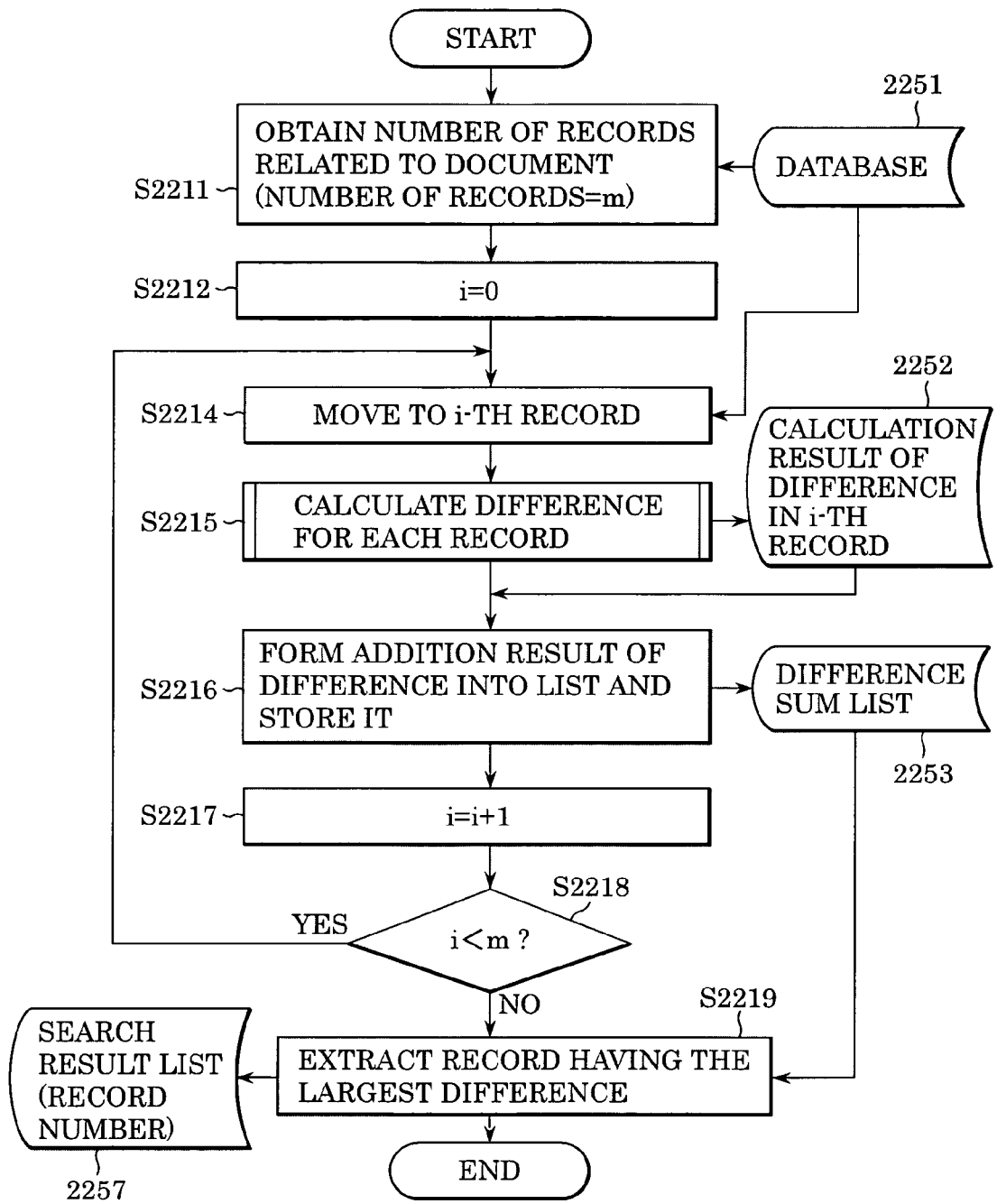
FIG. 22B is a flowchart illustrating details of step S2202 in FIG. 22A.

Main search processing is specifically discussed below with reference to FIGS. 22A through 22E. FIG. 22A is a flowchart illustrating the overall main search processing. When main search is started in step S2201, the process proceeds to step S2202 in which the layout editing application program 121 extracts records which are very different from the specified record based on the layout calculation result. FIG. 22B, described below, is a flowchart illustrating details of the processing of step S2202. The layout editing application program 121 then moves to the record extracted from a search result list 2257 in step S2203, and inserts data of the record extracted from the database 2251 into the container in step S2204. Then, the layout editing application program 121 computes the layout of the extracted record in step S2205, and displays the resulting layout of the extracted record in the layout view window as a preview in step S2206.

In step S2206, the layout of the specified record is also displayed in another layout view window, as shown in FIG. 8. It is then determined in step S2207 whether the layout is modified. If the layout is modified, the process proceeds to step S2208 in which the layout editing application program 121 computes the layout based on the modification of the layout. Then, the layout editing application program 121 displays the resulting layout again in step S2206. In accordance with the modified layout, the layout of the specified record should also be modified. Thus, the layout editing application program 121 computes the layout of the specified record, and displays the resulting layout as a preview in step S2206.

If it is found in step S2207 that the layout is not modified, the processing is completed.

Figure 22C:
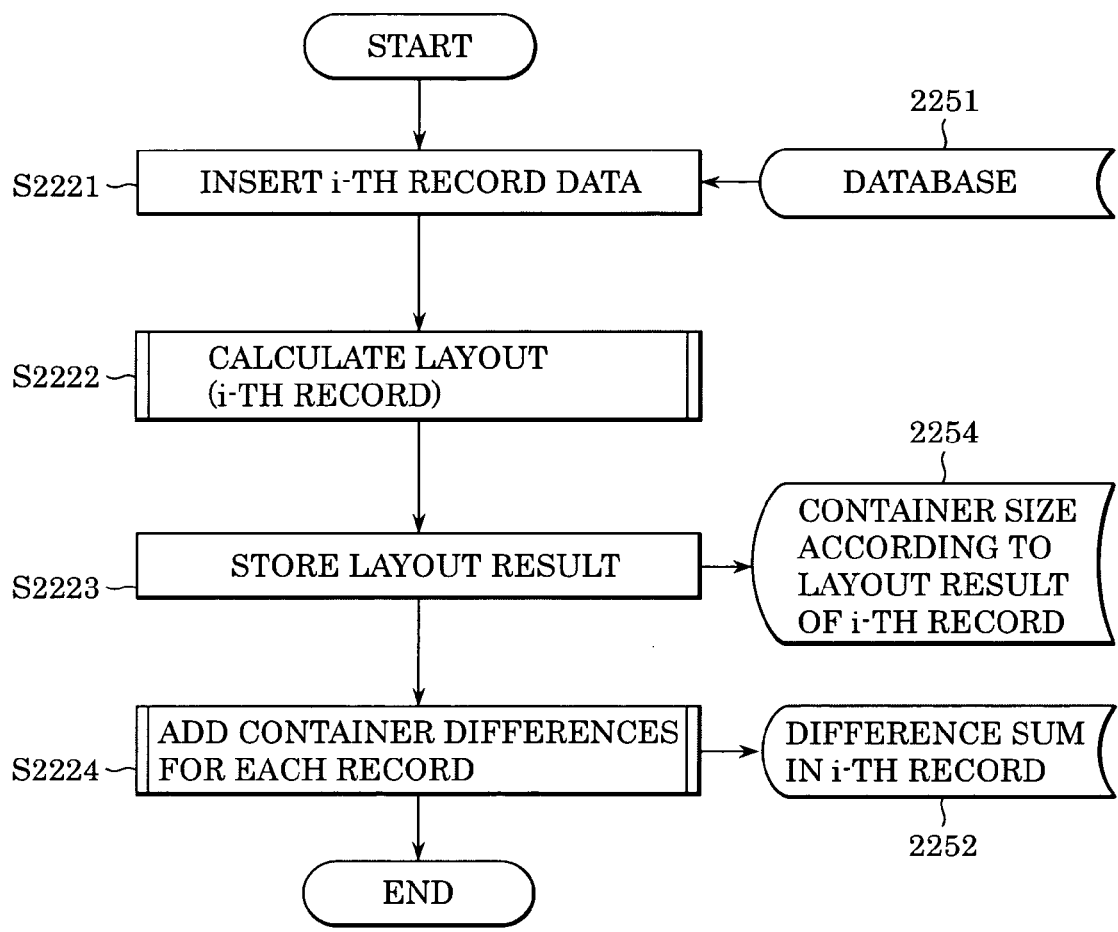
FIG. 22C is a flowchart illustrating details of step S2215 in FIG. 22B.

FIG. 22B is a flowchart illustrating details of step S2202 for extracting records which are very different from the specified record. In step S2211, the layout editing application program 121 obtains the number m of records related to the document from the database 2251 specified by the user. The counter i is set in step S2212, and steps S2214 through S2217 are repeated by the number m of records. In the loop of step S2214 through S2217, in step S2214, the layout editing application program 121 first moves to the i-th record indicated by the counter. The layout editing application program 121 then calculates the container difference for each record (i-th record) in step S2215 and adds the calculation result of the i-th record to a list 2253. FIG. 22C, described below is a flowchart illustrating details of the processing of step S2215 of calculating the difference for each record. In step S2216, the addition results of the differences for the individual lists are formed into a list 2253.

The process then proceeds to step S2217 in which the counter is incremented by one to move to the subsequent record. After repeating steps S2214 through S2217, when there is no record to be searched (step S2218), the layout editing application program 121 exits from the loop. In step S2219, the layout editing application program 121 extracts the record having the largest difference from the list 2253 and stores the extracted record number in the search result list 2257.

FIG. 22C is a flowchart illustrating details of step S2215 in FIG. 22B for calculating the difference for each record. In step S2221, the layout editing application program 121 obtains the data of the i-th record indicated by the counter from the database 2251, and inserts it into the container. The layout editing application program 121 then computes the layout in step S2222, and stores a layout result 2254 in the memory unit 136 in step S2223. After calculating the differences between the layout of the i-th record indicated by the counter and the layout of the specified record, the sum 2252 of the differences is calculated in step S2224.

Figure 22D:
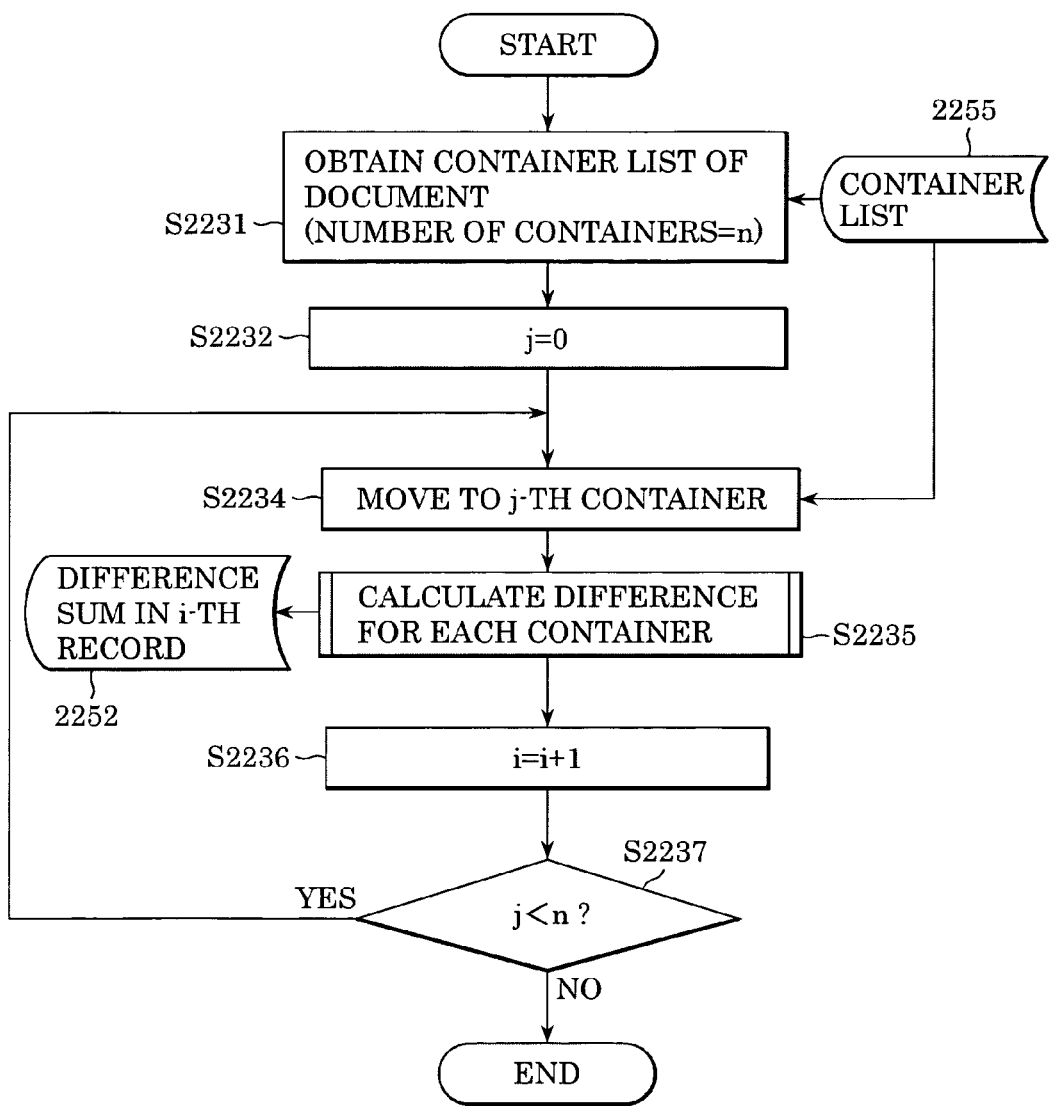
FIG. 22D is a flowchart illustrating details of step S2224 in FIG. 22C.
Figure 22E:
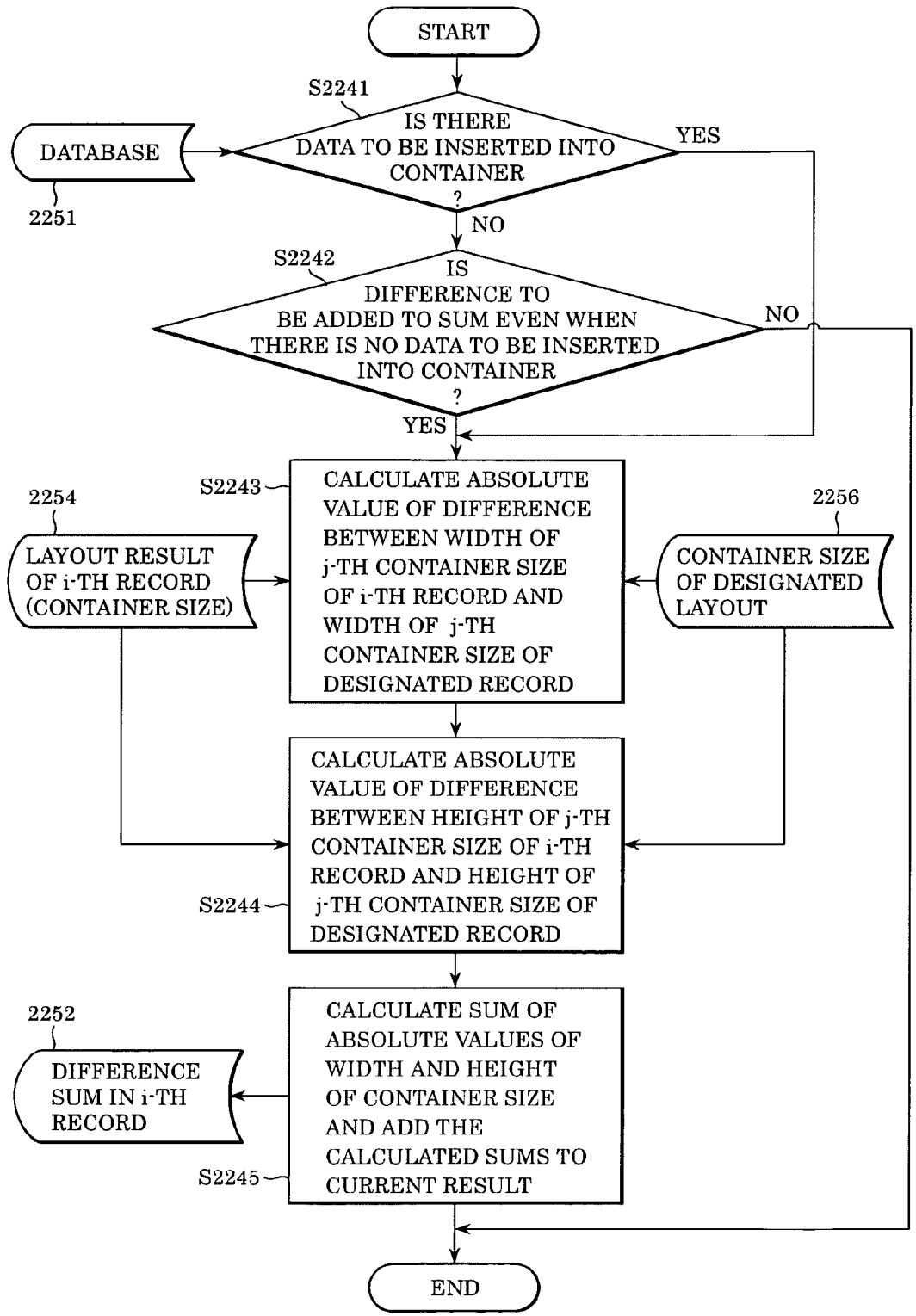
FIG. 22E is a flowchart illustrating details of step S2235 of FIG. 22D.

FIG. 22D is a flowchart illustrating details of step S2224 in FIG. 22C for calculating the sum of the differences for each record. In step S2231, the layout editing application program 121 obtains the number n of document containers from the container list 2255 stored in the file or the registry. Then, in step S2232, the counter j is set, and steps S2234 through S2236 are repeated by the number n of containers. In a main search, the layout differences are calculated for all records. In the loop of step S2234 through S2237, in step S2234, the layout editing application program 121 first moves to the j-th container indicated by the counter. Then, in step S2235, the layout editing application program 121 calculates the difference between the searched record and the specified record for each container, and stores the calculation result 2252 in the memory unit 136. FIG. 22E, described below, is a flowchart illustrating details of the processing of step S2235.

Then, in step S2236, the counter j is incremented by one to move to the subsequent container. After repeating steps S2234 through S2236, when there is no container to be searched (step S2237), the layout editing application program 121 exits from the loop.

FIG. 22E is a flowchart illustrating details of step S2235 of FIG. 22D for calculating the difference for each container. In step S2235, the difference between the data inserted into the j-th container of the specified record and the data inserted into the j-th container of the i-th record is calculated, and the sum of differences of all the records are obtained.

In step S2241, the layout editing application program 121 determines based on the database 2251 whether there is data to be inserted into the container to be searched (j-th container). If there is no data, the process proceeds to step S2242 to determine based on the check box 1436 (FIG. 14) of the property dialog box 1401 whether the difference of the container size is added as the i-th record even when there is no data. If the outcome of step S2242 is NO, the processing is completed. The reason for executing step S2242 has been described with reference to FIG. 14. If it is found in step S2242 that the difference is added to the sum even when there is no data, the process proceeds to step S2243. In step S2243, the layout editing application program 121 calculates the absolute value of the difference between the width of the j-th container size of the i-th record and the width of the j-th container size of the specified record based on the layout result 2254 of the i-th record calculated in step S2222 in FIG. 22C and the layout result 2256 of the specified record.

Then, in step S2244, the layout editing application program 121 calculates the absolute value of the difference 2254 between the height of the j-th container size of the i-th record and the height of the j-th container size of the specified record. The calculation results in steps S2243 and S2244 are stored in the memory unit 136. Then, in step S2245, the calculation results in steps S2243 and S2244 are added, and the sum is further added to the calculation result 2252 of the i-th record.

For example, in step S2235 in FIG. 22D, if i is 3 and j is 0, the layout editing application program 121 calculates the layout of the data of record number 3 when being inserted into container number 0 (container A). Then, the height and the width of the container A in the layout view window 851 shown in FIG. 8 result in 20 and 50, respectively. Since the specified record is record number 0, the layout of the data inserted into container A of this record can be calculated, resulting in the height of 35 and the width of 50, such as container A in the layout view window 801 shown in FIG. 8.

Thus, the absolute value of the difference of the height in the container A is 15 (35−20), and the absolute value of the difference of the width in the container A is 0 (50−50). Accordingly, the absolute values of the differences of the height and width are added to be 15 (15+0). The value 15 is added to the sum of the differences of record number 3. At this point, since the difference has been calculated only for container number 0, the total sum of the differences is 15.

Then, in step S2236, the container number i is incremented by one, and calculations are performed for container number 1 in a manner similar to calculations for container number 0.

The layout of the data of record number 3 when being inserted into container number 1 (container B) can be calculated, resulting in the height of 50 and the width of 50, such as container B in the layout view window 851 shown in FIG. 8. The height and the width of the container size of the specified record are 35 and 50, respectively, as in container B in the layout view window 801 shown in FIG. 8. Thus, the absolute values of the differences of the height and the width in container B are 15 and 0, respectively. Thus, the sum of the absolute values of the differences between record 0 and the specified record is 15. The value 15 is added to the total sum in record 3, resulting in 30 (15 for container number 0 and 15 for container number 1).

Similarly, if the differences of the height and the width of container number 2 (container C) are 30 and 0, respectively, the sum of the differences of the height and width for container number 2 is 30, and the total sum for record number 3 becomes 60. If the differences of the height and the width for container number 3 are 0 and 0, respectively, the sum of the differences of the height and width for container number 3 is 0, and the total sum for record number 3 remains as 60. Likewise, if the differences of the height and the width for container number 4 are 15 and 0, respectively, the sum of the differences of the height and the width for container number 4 is 15, and the total sum for record number 3 of 75. In this manner, the sum of the differences for all containers is determined for each record, and the record having the largest difference is extracted from the list 2253 (step S2219 in FIG. 22B). The above-described processing is executed under the control of the processor unit 135 and the layout editing application program 121.

According to the first embodiment of the present invention, the layout results can be efficiently checked for all records.

Second Embodiment

Figure 21A:
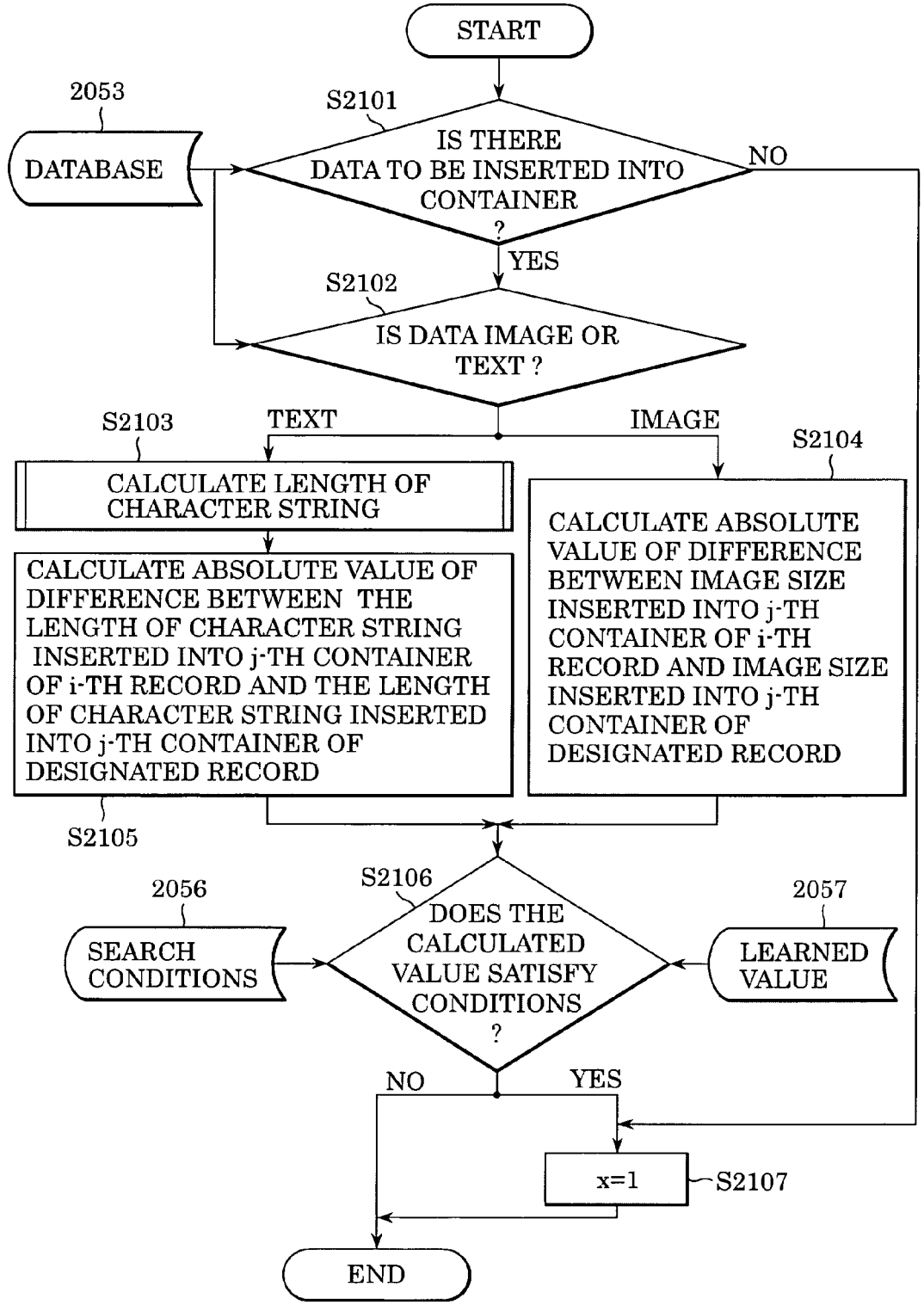
FIG. 21A is a flowchart illustrating step S2025 in FIG. 2C according to a second embodiment of the present invention.

A second embodiment of the present invention is described below with reference to FIGS. 21A and 21B. FIG. 21A is a flowchart illustrating step S2025 of FIG. 20C in a simple search according to an algorithm different from that shown in FIG. 20D. In this embodiment, the difference is calculated based on the j-th container of the specified record and the data inserted into the j-th container, and it is checked whether the j-th container indicated by the current counter matches the condition. Although this is similar to that of the first embodiment, the calculation method for the difference is different from that of the first embodiment.

In FIG. 21A, in step S2101, the layout editing application program 121 checks from the database 2053 whether there is data to be inserted into the container to be searched.

If there is no data, the layout editing application program 121 determines that the container matches the condition and proceeds to step S2107 in which the check variable is set to be 1, and the processing is completed. If there is data to be inserted into the container, the layout editing application program 121 proceeds to step S2102 to determine whether the data is text or image data. If the data is text, the process proceeds to step S2103 in which the layout editing application program 121 calculates from the font information set in the j-th container the length of the character string inserted into the j-th container of the i-th record and the length of the character string inserted into the j-th container of the specified record when being aligned.

Figure 21B:
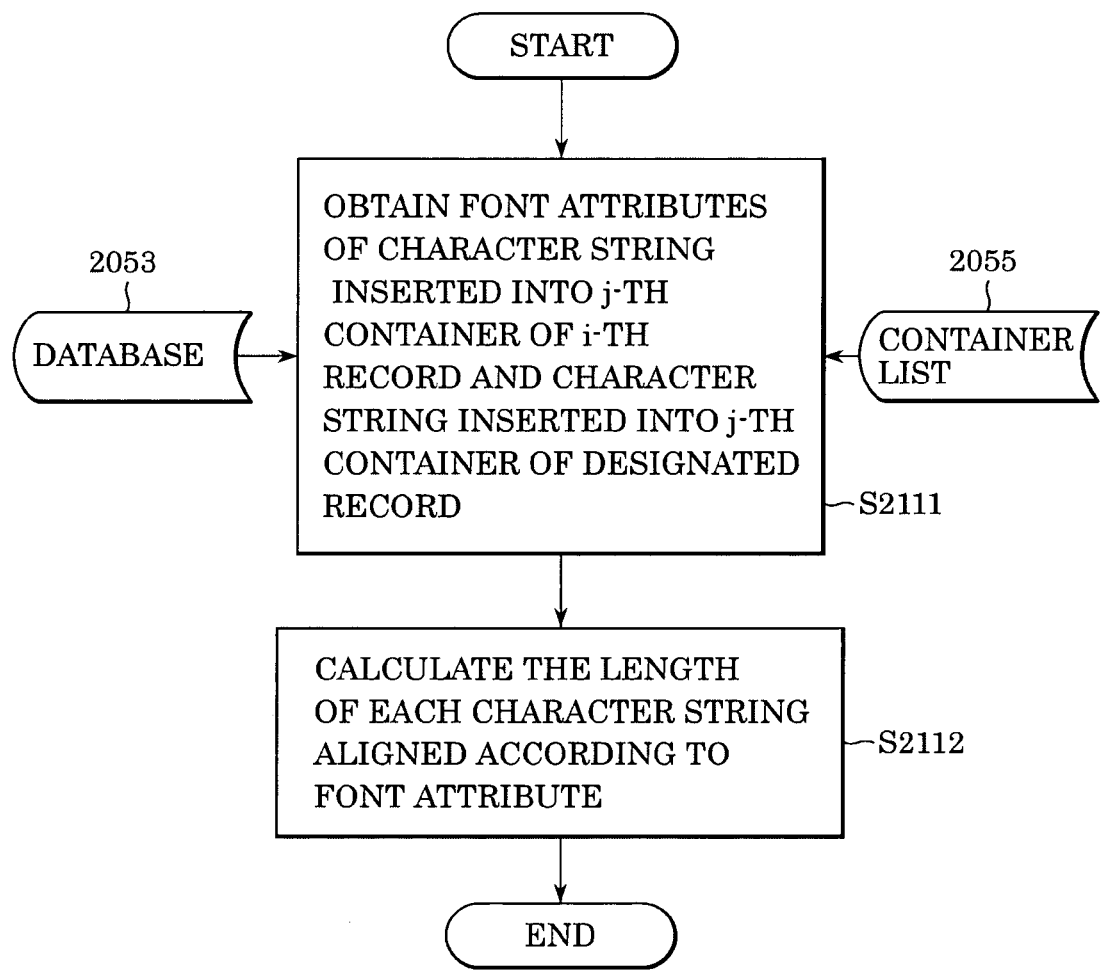
FIG. 21B is a flowchart illustrating details of step S2103 in FIG. 21A.

FIG. 21B is a flowchart illustrating details of step S2103 in FIG. 21A for calculating the character string. In step S2111, the layout editing application program 121 obtains the character string inserted into the j-th container of the i-th record, the character string inserted into the j-th container of the specified record, and the font attributes of the two containers from the database 2053 and the container list 2055, and calculates from the font attributes the length of each character string when being aligned in step S2112.

For example, in step S2033 in FIG. 20D, if i is 3 and j is 4, the character string inserted into container number 4 (container E) of record number 3 in the font size point 10 set in container number 4 can be calculated to be 250 mm. The character string inserted into container number 4 (container E) of record number 0 when it is aligned in the font size point 10 can be calculated to be 650 mm. Accordingly, the absolute value of the difference between the container E of record number 3 and the container E of record number 0 is 400 (650-250), and if this value matches the condition set in the layout property, the record is added to the search result list. The above-described processing is executed under the control of the processor unit 135. This method is particularly effective for English fonts. Since the horizontal length of characters in English fonts is considerably different according to the characters, and mere comparison of the number of characters does not precisely reflect the actual size. Thus, by calculating the size by using the font set in the container, search can be conducted more precisely.

Third Embodiment

Figure 23:
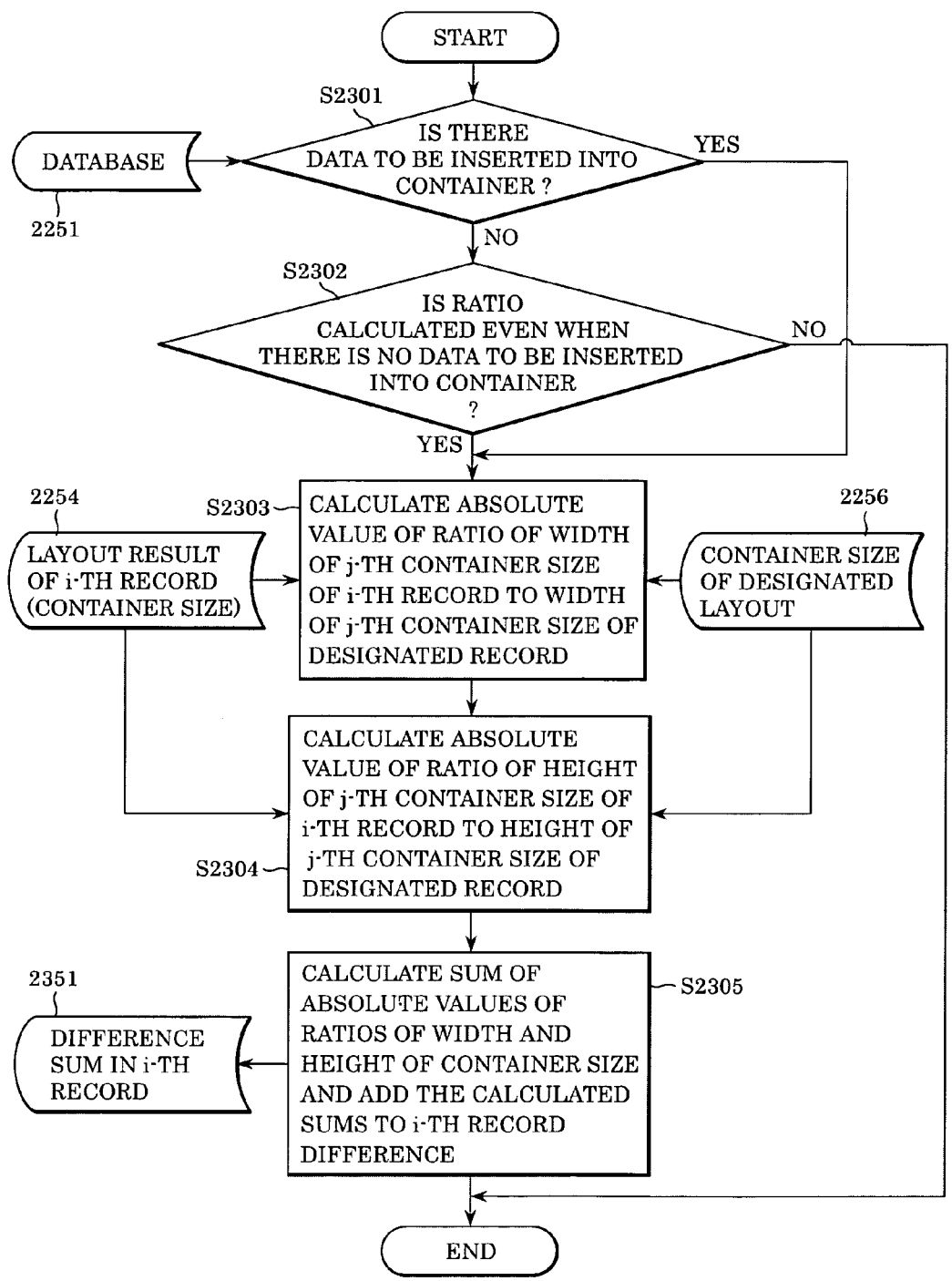
FIG. 23 is a flowchart illustrating step S2235 in FIG. 22D according to a third embodiment of the present invention.

A third embodiment of the present invention is discussed below with reference to FIG. 23. FIG. 23 is a flowchart illustrating step S2235 of FIG. 22D according to an algorithm different from that used for FIG. 22E. In this embodiment, the difference between the layouts is calculated based on the data inserted into the j-th container of the specified record and the data inserted into the j-th container of the record to be searched, and the layout difference of the j-th container indicated by the current counter is determined as the difference for the i-th record. Then, the differences of the individual counters are added. Although this is similar to that of the first embodiment, the calculation method for the layout difference is different from that of the first embodiment.

In step S2301, the layout editing application program 121 determines from the database 2251 whether there is data to be inserted into the j-th container to be searched. If there is no data, the layout editing application program 121 proceeds to step S2302 to determine based on the check box 1436 of the property dialog window 1401 (FIG. 14) whether the difference of the ratio of the container size is calculated and is added as the difference for the i-th record even when there is no data.

If the outcome of step S2302 is NO, the processing is completed. The reason for executing step S2302 has been described with reference to FIG. 14. If the outcome of step S2302 is YES, the layout editing application program 121 calculates the absolute value of the ratio of the width of the j-th container size of the i-th record to the width of the j-th container size of the specified record from the container size 2254 of the layout of the i-th record calculated in step S2222 of FIG. 22C and the layout 2256 of the specified record.

In step S2304, the layout editing application program 121 calculates the absolute value of the ratio of the height of the j-th container size of the i-th record to the height of the j-th container size of the specified record. The absolute value of the ratio of the width calculated in step S2303 and the absolute value of the ratio of the height calculated in step S2304 are stored in the memory. Then, in step S2305, the absolute values of the ratio of the width and the ratio of the height are added as the layout difference for the i-th record, and are stored. The above-described processing is executed under the control of the processor unit 135. In this embodiment, information concerning the width and height is evaluated by the ratio (dimensionless amount), thus increasing the calculation precision.

Fourth Embodiment

Figure 24A:
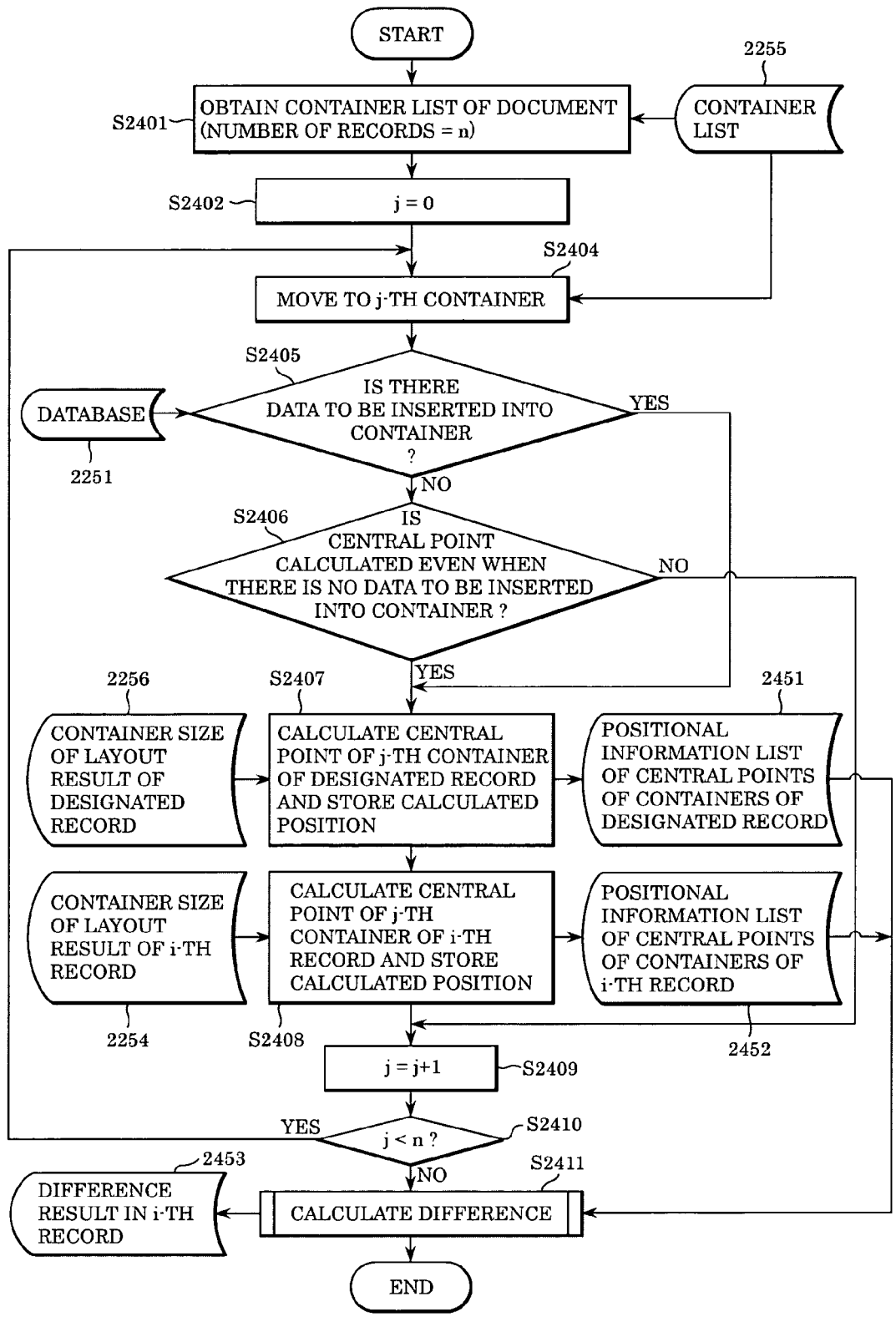
FIG. 24A is a flowchart illustrating step S2224 in FIG. 22C according to a fourth embodiment of the present invention.

A fourth embodiment of the present invention is described below with reference to FIGS. 24A and 24B. FIG. 24A is a flowchart illustrating step S2224 of FIG. 22C according to an algorithm different from that used in the first embodiment. In this embodiment, the difference is calculated based on the data inserted into the j-th container of the specified record and the data inserted into the j-th container of the record to be searched, and the layout difference of the j-th container is added to the sum of the difference 2252 for the i-th record. Although this is similar to the first embodiment, the calculation method for the difference is different from that of the first embodiment.

In step S2401, the layout editing application program 121 obtains the number n of document containers from a container list 2255 stored in the file or the registry.

In step S2402, the layout editing application program 121 sets the counter j, and repeats steps S2402 through S2409 for the number n of containers.

In the loop of step S2404 through S2410, in step S2404, the layout editing application program 121 first moves to the j-th container indicated by the counter. The layout editing application program 121 then determines in step S2405 from the database 2251 whether there is data to be inserted into the j-th container.

If there is no data, the layout editing application program 121 proceeds to step S2406 to determine from the check box 1436 of the property dialog box 1401 (FIG. 14) whether to calculate the central point even when there is not data. If the outcome of step S2406 is NO, the process proceeds to step S2409 in which the counter j is incremented by one. The reason for executing step S2406 has been described with reference to FIG. 14.

If the outcome of step S2406 is YES, the process proceeds to step S2407. In step S2407, the layout editing application program 121 calculates the positional information concerning the central point of the j-th container of the specified record from the container size 2256 of the layout of the specified record, and stores the positional information in a positional information list 2451 for the designated record of the memory unit 136.

Then, in step S2408, the layout editing application program 121 calculates the positional information concerning the central point of the j-th container of the i-th record from the container size 2254 of the layout of the i-th record, and stores the positional information in a positional information list 2452 for the i-th record of the memory unit 136.

In step S2409, the layout editing application program 121 increments the counter j by one to move to the subsequent container. After repeating steps S2404 through S2409, the layout editing application program 121 exits from the loop when there is no container to be searched (S2410). Then, in step S2411, the layout editing application program 121 determines the difference of the distance between the central point of the i-th record and the central point of the specified record, and stores the result in the memory unit 136 as a difference 2453 for the i-th record.

Figure 24B:
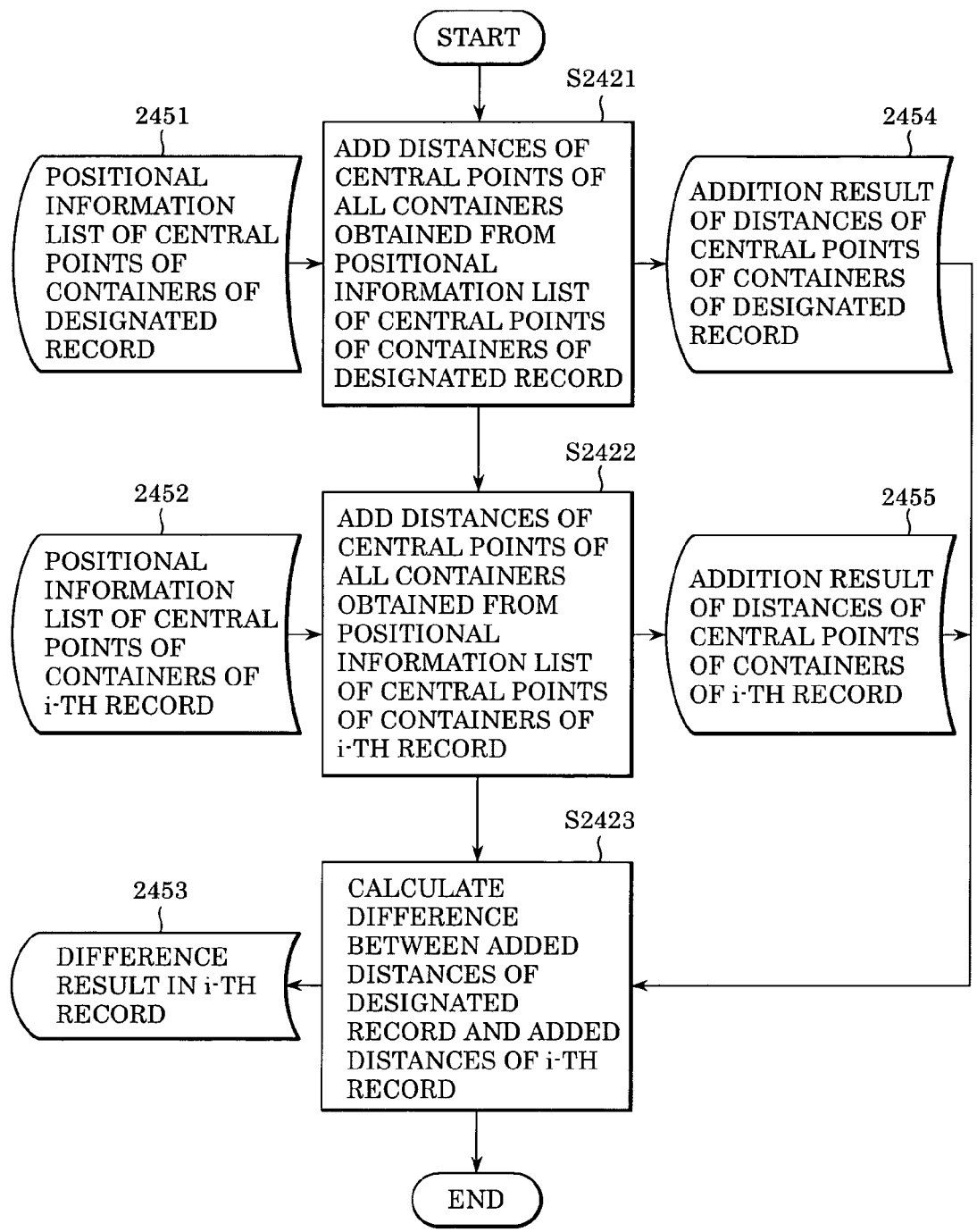
FIG. 24B is a flowchart illustrating details of step S2411 in FIG. 24A.

FIG. 24B is a flowchart illustrating details of step S2411 of FIG. 24A for calculating the difference. In step S2421, the layout editing application program 121 reads the positional information concerning the central points of all the containers from the positional information list 2451 for the designated record, and adds the positions of the central points as the distance, and then stores the added distance in the memory unit 136 as an addition result 2454. FIG. 28 illustrates an example of the positional information list in which and the X coordinate, the Y coordinate, and the distance (X+Y) for the i-th record are formed.

Then, in step S2422, the layout editing application program 121 reads the positional information concerning the central points of all the containers of the i-th record from the positional information list 2452 for the i-th record, and adds the positions of the central points as the distance, and then stores the added distance in the memory unit 136 as an addition result 2455. Then, in step S2423, the layout editing application program 121 calculates the difference between the addition result 2454 and the addition result 2455, and stores the layout difference 2453 for the i-th record in the memory unit 136. The above-described processing is executed under the control of the processor unit 135.

According to this embodiment, even when it is demanded that the layout of data to be inserted into containers is symmetrical, the compatibility between the data and containers can be efficiently calculated.

Fifth Embodiment

Figure 25:
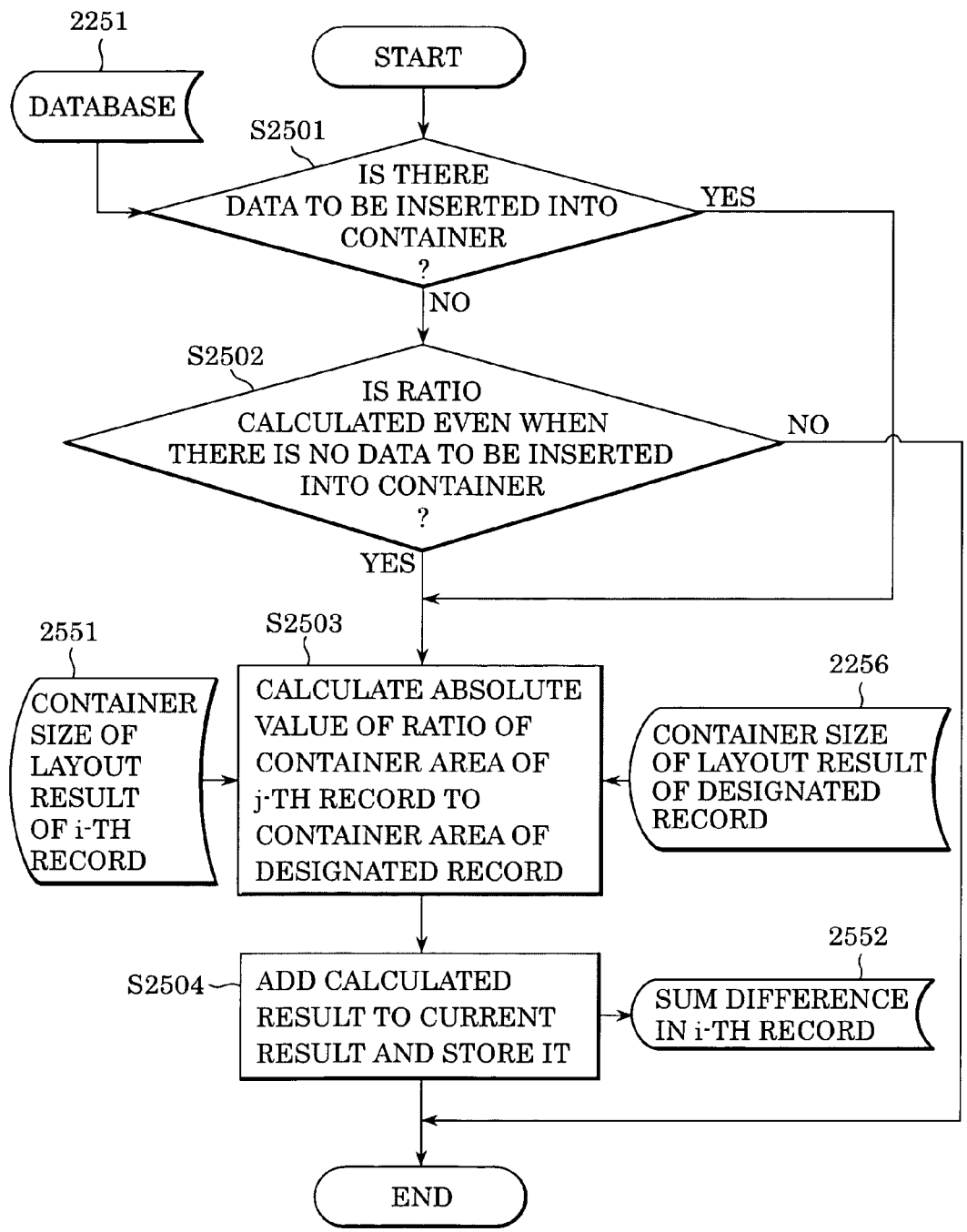
FIG. 25 is a flowchart illustrating step S2235 in FIG. 22D according to a fifth embodiment of the present invention.

A fifth embodiment of the present invention is described below with reference to FIG. 25. FIG. 25 is a flowchart illustrating step S2235 of FIG. 22D for calculating the difference for each container according to an algorithm different from that used for the first embodiment. In this embodiment, the layout difference is calculated based on the data inserted into the j-th container of the specified record and the data inserted into the j-th container of the i-th record, and is added to the calculation result 2252 for the i-th record. Although this is similar to that of the first embodiment, the calculation method for the layout difference is different from that of the first embodiment.

In step S2501, the layout editing application program 121 determines from the database 2251 whether there is data to be inserted into the j-th container to be searched. If there is no data, the layout editing application program 121 proceeds to step S2502 to determine from the check box 1436 of the property dialog window 1401 (FIG. 14) whether the ratio of the area of the container is calculated and the result is added to the sum of the difference for the i-th record even when there is no data to be inserted into the container.

If the outcome of step S2502 is NO, the processing is completed. The reason for executing step S2502 has been described with reference to FIG. 14. If the outcome of step S2502 is YES, the process proceeds to step S2503. In step S2503, the layout editing application program 121 calculates the absolute value of the ratio of the area of the j-th container of the i-th record to the area of the j-th container of the specified record from the container size 2254 of the layout for the i-th record calculated in step S2222 of FIG. 22C and the container size 2256 of the layout for the specified record. Then, in step S2504, the layout editing application program 121 stores the calculation result in step S2503 in the memory unit 136 as an addition result 2552 for the i-th record. The above-described processing is executed under the control of the processor unit 135.

According to this embodiment, when data to be inserted into a container is image data, the layout result can be quantitatively evaluated according to the ratio of the area of the data occupied in the container. Thus, the compatibility between the data and containers can be efficiently calculated.

Other Embodiments

A storage medium storing therein software program code implementing the functions of the above-described embodiments can be supplied to a system or an apparatus, and a computer (or a central processing unit (CPU) or a microprocessing unit (MPU)) of the system or the apparatus reads and executes the program code stored in the storage medium.

In this case, the program code itself read from the storage medium implements the functions of the foregoing embodiments.

The storage medium storing the program code may include a flexible disk, a hard disk, an optical disc, a magneto-optical disk, a CD-ROM, a CD-R (compact disk-recordable), magnetic tape, a non-volatile memory card, and a ROM.

The functions of the foregoing embodiments are implemented by executing the program code read by the computer, and may be implemented by executing all of or part of the processing by an operating system (OS) running on the computer based on instructions of the program code.

The program code read from the storage medium may be written into a memory provided for a feature expansion board inserted into the computer or a feature expansion unit connected to the computer, and a CPU provided for the feature expansion board or the feature expansion unit executes all of or part of the processing based on instructions of the program code. In this case, the functions of the foregoing embodiments can be implemented.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-024590 filed Jan. 30, 2004, which is hereby incorporated by reference herein.

What is claimed is:

1. An information processing method for assigning variable data input from a data source to partial display areas contained in a template so as to determine the size of each of the partial display areas based on the assigned variable data, the information processing method comprising:

a preliminary search step of determining a difference between specified data and stored data for each of a plurality of stored data, wherein the stored data is stored in the data source;

a first extracting step of extracting stored data to be laid out from the plurality of stored data based on the difference determined in the preliminary search step and a designated first extracting condition;

a layout step of determining a plurality of first layouts for the each of the extracted stored data by assigning each of the stored data extracted in the first extracting step to the partial display areas of the template, and determining a single second layout for the specified data by assigning the specified data to the partial display areas of the template;

a layout comparison step of determining a layout difference between the plurality of first layouts and the single second layout determined in the layout step;

a second extracting step of extracting, from the plurality of first layouts, the first layout to be output based on the layout difference determined in the layout comparison step and a designated second extracting condition; and an output control step of outputting the first layout extracted in the second extracting step.

2. The information processing method according to claim 1, wherein the first extracting step comprises extracting an item of data having a certain difference between at least one of dimensions of the image of the stored data and the number of characters of the text data of the stored data and the specified data.

3. The information processing method according to claim 1, wherein the second extracting step comprises extracting the item of data by performing a quantification operation on a difference between the second layout based on the specified data and the first layout based on the plurality of items of stored data assigned to the partial display areas.

4. The information processing method according to claim 3, wherein the quantification operation is performed on at least one of a difference between a size of the extracted item of data and a size of the specified data, a distance between a central point of the extracted item of data and a central point of the specified data based on positional information concerning the partial display areas, and a ratio of an area of the extracted item of data to an area of the specified data in the partial display areas.

5. The information processing method according to claim 4, wherein, when the second extracting step performs the quantification operation by using the ratio of the area of the extracted item of data to the area of the specified data in the partial display areas, and when an amount of data to be assigned is zero, the second extracting step excludes the data from the quantification operation.

6. The information processing method according to claim 3, wherein the designated second extracting condition includes an instruction to perform the quantification operation, a number of items of data to be extracted for generating the first layout, and an instruction as to whether, when an amount of data to be assigned is zero, the data is to be subjected to the quantification operation.

7. An information processing apparatus, including a processor unit and a display device, for assigning variable data input from a data source to partial display areas contained in a template so as to determine the size of each of the partial display areas based on the assigned variable data, the information processing apparatus comprising:
  preliminary search means for determining a difference between specified data and stored data for each of a plurality of stored data, wherein the stored data is stored in the data source;
  first extracting means for extracting stored data to be laid out from the plurality of stored data based on the difference determined by the preliminary search means and a designated first extracting condition;
  layout means for determining a plurality of first layouts for each of the extracted stored data by assigning each of the stored data extracted by the first extracting means to the partial display areas of the template, and determining a single second layout for the specified data by assigning the specified data to the partial display area of the template;
  layout comparison means, performed by the processor unit, for determining a layout difference between the plurality of first layouts and the single second layout determined by the layout means;
  second extracting means for extracting, from the plurality of first layouts, the first layout to be output based on the layout difference determined by the layout comparison means and a designated second extracting condition; and output control means for outputting, to a display device, the first layout extracted by the second extracting means.

8. The information processing apparatus according to claim 7, wherein the first extracting means comprises extracting an item of data having a certain difference between at least one of dimensions of the image of the stored data and the number of characters of the text data of the stored data and the specified data.

9. The information processing apparatus according to claim 7, wherein the second extracting means extracts the item of data by performing a quantification operation on a difference between the second layout based on the specified data and the first layout based on the plurality of items of stored data assigned to the partial display areas.

10. The information processing apparatus according to claim 9, wherein the quantification operation is performed on at least one of a difference between a size of the extracted item of data and a size of the specified data, a distance between a central point of the extracted item of data and a central point of the specified data based on positional information concerning the partial display areas, and a ratio of an area of the extracted item of data to an area of the specified data in the partial display areas.

11. The information processing apparatus according to claim 10, wherein, when the second extracting means performs the quantification operation by using the ratio of the area of the extracted item of data to the area of the specified data in the partial display areas, and when an amount of data to be assigned is zero, the second extracting means excludes the data from the quantification operation.

12. The information processing apparatus according to claim 9, wherein the designated second extracting condition includes an instruction to perform the quantification operation, a number of items of data to be extracted for generating the first layout, and an instruction as to whether, when an amount of data to be assigned is zero, the data is to be subjected to the quantification operation.

13. A computer-readable storage medium having stored thereon a computer program for allowing a computer to execute information processing for assigning variable data input from a data source to partial display areas contained in a template so as to determine the size of each of the partial display areas based on the assigned variable data, the computer program comprising:
  a preliminary search step of determining a difference between specified data and stored data for each of a plurality of stored data, wherein the stored data is stored in the data source;
  a first extracting step of extracting stored data to be laid out from the plurality of stored data based on the difference determined in the preliminary search step and a designated first extracting condition;
  a layout step of determining a plurality of first layouts for each of the extracted stored data by assigning each of the stored data extracted in the first extracting step to the partial display areas of the template, and determining a single second layout for the specified data by assigning the specified data to the partial display areas of the template;
  a layout comparison step of determining a layout difference between the plurality of first layouts and the single second layout determined in the layout step;
  a second extracting step of extracting, from the plurality of first layouts, the first layout to be output based on the layout difference determined in the layout comparison step and a designated second extracting condition; and an output control step of outputting the first layout extracted in the second extracting step.

14. The computer-readable storage medium according to claim 13, wherein the first extracting step allows the computer to execute extracting an item of data having a certain difference between at least one of dimensions of the image of the stored data and the number of characters of the text data of the stored data and the specified data.

15. The computer-readable storage medium according to claim 13, wherein the second extracting step allows the computer to execute extracting the item of data by performing a quantification operation on a difference between the second layout based on the specified data and the first layout based on the plurality of items of stored data assigned to the partial display areas.

16. The computer-readable storage medium according to claim 15, wherein the quantification operation is performed on at least one of a difference between a size of the extracted item of data and a size of the specified data, a distance between a central point of the extracted item of data and a central point of the specified data based on positional information concerning the partial display areas, and a ratio of an area of the extracted item of data to an area of the specified data in the partial display areas.

17. The computer-readable storage medium according to claim 16, wherein, when the second extracting step performs the quantification operation by using the ratio of the area of the extracted item of data to an area of the specified data in the partial display areas, and when an amount of data to be assigned is zero, the second extracting step allows the computer to exclude the data from the quantification operation.

18. The computer-readable storage medium according to claim 15, wherein the designated second extracting condition includes an instruction to perform the quantification operation, a number of items of data to be extracted for generating the first layout, and an instruction as to whether, when an amount of data to be assigned is zero, the data is to be subjected to the quantification operation.

* * * * *